(12) United States Patent
Faley et al.

(10) Patent No.: US 10,074,981 B2
(45) Date of Patent: Sep. 11, 2018

(54) POWER CONTROL SYSTEMS AND METHODS

(71) Applicant: Alpha Technologies Inc., Bellingham, WA (US)

(72) Inventors: Brian Faley, Arlington, WA (US);
David LeBow, Bellingham, WA (US);
Pankaj H. Bhatt, Bellingham, WA (US)

(73) Assignee: Alpha Technologies Inc., Bellingham, WA (US)

( * ) Notice: Subject to any disclaimer, the term of this patent is extended or adjusted under 35 U.S.C. 154(b) by 180 days.

(21) Appl. No.: 15/263,234

(22) Filed: Sep. 12, 2016

(65) Prior Publication Data
US 2017/0077704 A1 Mar. 16, 2017

Related U.S. Application Data

(60) Provisional application No. 62/217,958, filed on Sep. 13, 2015.

(51) Int. Cl.
*H02J 3/32* (2006.01)
*H02J 3/14* (2006.01)
(Continued)

(52) U.S. Cl.
CPC .................. *H02J 3/14* (2013.01);
*H02J 3/32* (2013.01); *H02J 3/383* (2013.01);
*H02J 5/00* (2013.01);
(Continued)

(58) Field of Classification Search
CPC ...... H02J 3/14; H02J 3/32; H02J 3/383; H02J 5/00; H02J 2003/388; H02M 3/04;
(Continued)

(56) References Cited

U.S. PATENT DOCUMENTS 352,105 A 11/1886 Zipernowsky et al.
375,614 A 12/1887 Eickemeyer
(Continued)

FOREIGN PATENT DOCUMENTS

AU 687528 12/1995
AU 2029495 A 12/1995
(Continued)

OTHER PUBLICATIONS

Wallace et al., Wireless Load Sharing of Single Phase Telecom Inverters, Telecommunication Energy Conference, 1999, 13 pages.
(Continued)

*Primary Examiner* — Robert Deberadinis
(74) *Attorney, Agent, or Firm* — Michael R. Schacht; Schacht Law Office, Inc.

(57) ABSTRACT

A power supply configured to be operatively connected to at least one load, comprising an AC bus operatively connected to the load, a first AC power source operatively connected to the AC bus, a DC bus, a DC/AC converter operatively connected between the DC bus and the AC bus, a first DC power source, and a load balancer operatively connected between the first DC power source and the DC bus. The power supply operates in a first mode in which power is supplied to the load from the first AC power source through the AC bus and in a second mode in which power is supplied to the load from the first DC power source through the DC bus, the DC/AC converter, and the AC bus.

20 Claims, 9 Drawing Sheets

(51) Int. Cl.
*H02M 3/04* (2006.01)
*H02M 7/44* (2006.01)
*H02J 3/38* (2006.01)
*H02J 5/00* (2016.01)

(52) U.S. Cl.
CPC .............. *H02M 3/04* (2013.01); *H02M 7/44* (2013.01); *H02J 2003/388* (2013.01); *Y02E 10/563* (2013.01); *Y02E 10/566* (2013.01); *Y02E 70/30* (2013.01)

(58) Field of Classification Search
CPC ........ H02M 7/44; Y02E 70/30; Y02E 10/563; Y02E 10/566
See application file for complete search history.

(56) References Cited

U.S. PATENT DOCUMENTS

| | | |
|---|---|---|
| 414,266 A | 11/1889 | Thomson |
| 1,718,238 A | 6/1929 | Kettering et al. |
| 1,950,396 A | 3/1934 | Boucher |
| 2,007,415 A | 7/1935 | Walker |
| 2,014,101 A | 9/1935 | Bryan |
| 2,037,183 A | 4/1936 | Strieby |
| 2,037,188 A | 4/1936 | Russell |
| 2,036,994 A | 12/1936 | Frank et al. |
| 2,063,994 A | 12/1936 | Frank et al. |
| 2,085,072 A | 6/1937 | Bobe |
| 2,165,969 A | 7/1939 | Humbert et al. |
| 2,240,123 A | 4/1941 | Shoup et al. |
| 2,302,192 A | 11/1942 | Dannheiser |
| 2,352,073 A | 6/1944 | Boucher et al. |
| 2,427,678 A | 9/1947 | Laging |
| 2,444,794 A | 7/1948 | Uttal et al. |
| 2,512,976 A | 6/1950 | Smeltzly |
| 2,688,704 A | 9/1954 | Christenson |
| 2,856,543 A | 10/1958 | Dixon et al. |
| 2,920,211 A | 1/1960 | Gotoh |
| 2,996,656 A | 8/1961 | Sola |
| 3,022,458 A | 2/1962 | Sola |
| 3,064,195 A | 11/1962 | Freen |
| 3,221,172 A | 11/1965 | Rolison |
| 3,283,165 A | 11/1966 | Bloch |
| 3,293,445 A | 12/1966 | Levy |
| 3,304,599 A | 2/1967 | Nordin |
| 3,305,762 A | 2/1967 | Geib, Jr. |
| 3,339,080 A | 8/1967 | Howald |
| 3,345,517 A | 10/1967 | Smith |
| 3,348,060 A | 10/1967 | Jamieson |
| 3,389,329 A | 6/1968 | Quirk et al. |
| 3,435,358 A | 3/1969 | Rheinfelder |
| 3,458,710 A | 7/1969 | Dodge |
| 3,521,152 A | 7/1970 | Emerson |
| 3,525,035 A | 8/1970 | Kakalec |
| 3,525,078 A | 8/1970 | Baggott |
| 3,546,571 A | 12/1970 | Fletcher et al. |
| 3,590,362 A | 6/1971 | Kakalec |
| 3,636,368 A | 1/1972 | Sia |
| 3,678,284 A | 7/1972 | Peters |
| 3,678,377 A | 7/1972 | Chiffert |
| 3,686,561 A | 8/1972 | Spreadbury |
| 3,691,393 A | 9/1972 | Papachristou |
| 3,737,858 A | 6/1973 | Turner et al. |
| 3,742,251 A | 6/1973 | Thompson et al. |
| 3,823,358 A | 7/1974 | Rey |
| 2,860,748 A | 1/1975 | Everhart et al. |
| 3,859,589 A | 1/1975 | Rush |
| 3,860,748 A | 1/1975 | Everhart et al. |
| 3,873,846 A | 3/1975 | Morio et al. |
| 3,909,560 A | 9/1975 | Martin et al. |
| 3,916,295 A | 10/1975 | Hunter |
| 3,938,033 A | 2/1976 | Borkovitz et al. |
| 3,943,447 A | 3/1976 | Shomo, III |
| 4,004,110 A | 1/1977 | Whyte |
| 4,010,381 A | 3/1977 | Fickenscher et al. |
| 4,060,844 A | 11/1977 | Davis et al. |
| 4,122,382 A | 10/1978 | Bernstein |
| 4,130,790 A | 12/1978 | Heisey |
| 4,170,761 A | 10/1979 | Koppehele |
| 4,198,624 A | 4/1980 | Watanabe |
| 4,217,533 A | 8/1980 | Van Beek |
| 4,251,736 A | 2/1981 | Coleman |
| 4,262,245 A | 4/1981 | Wendt |
| 4,270,080 A | 5/1981 | Kostecki |
| 4,277,692 A | 7/1981 | Small |
| 4,295,053 A | 10/1981 | Kovatch et al. |
| 4,295,054 A | 10/1981 | Kovatch et al. |
| 4,313,060 A | 1/1982 | Fickenscher et al. |
| 4,353,014 A | 10/1982 | Willis |
| 4,366,389 A | 12/1982 | Hussey |
| 4,366,390 A | 12/1982 | Rathmann |
| 4,385,263 A | 5/1983 | Luz et al. |
| 4,400,624 A | 8/1983 | Ebert, Jr. |
| 4,400,625 A | 8/1983 | Hussey |
| 4,423,379 A | 12/1983 | Jacobs et al. |
| 4,446,458 A | 5/1984 | Cook |
| 4,460,834 A | 7/1984 | Gottfried |
| 4,466,041 A | 8/1984 | Witulski et al. |
| 4,472,641 A | 9/1984 | Dickey et al. |
| 4,475,047 A | 10/1984 | Ebert |
| 4,477,799 A | 10/1984 | Rocci et al. |
| 4,510,401 A | 4/1985 | Legoult |
| 4,604,530 A | 8/1986 | Shibuya |
| 4,616,305 A | 10/1986 | Damiano et al. |
| 4,628,426 A | 12/1986 | Steigerwald |
| 4,631,471 A | 12/1986 | Fouad et al. |
| 4,656,412 A | 4/1987 | McLyman |
| 4,670,702 A | 6/1987 | Yamada et al. |
| 4,673,825 A | 6/1987 | Raddi et al. |
| 4,686,375 A | 8/1987 | Gottfried |
| 4,697,134 A | 9/1987 | Burkum et al. |
| 4,700,122 A | 10/1987 | Cimino et al. |
| 4,709,318 A | 11/1987 | Gephart et al. |
| 4,719,427 A | 1/1988 | Morishita et al. |
| 4,719,550 A | 1/1988 | Powell et al. |
| 4,775,800 A | 1/1988 | Wood |
| 4,724,290 A | 2/1988 | Campbell |
| 4,724,478 A | 2/1988 | Masuko et al. |
| 4,730,242 A | 3/1988 | Divan |
| 4,733,223 A | 3/1988 | Gilbert |
| 4,740,739 A | 4/1988 | Quammen et al. |
| 4,745,299 A | 5/1988 | Eng et al. |
| 4,748,341 A | 5/1988 | Gupta |
| 4,748,342 A | 5/1988 | Dijkmans |
| 4,763,014 A | 8/1988 | Model et al. |
| 4,791,542 A | 12/1988 | Piaskowski |
| 4,829,225 A | 5/1989 | Podrazhansky et al. |
| 4,860,185 A | 8/1989 | Brewer et al. |
| 4,864,483 A | 9/1989 | Divan |
| 4,882,717 A | 11/1989 | Hayakawa et al. |
| 4,885,474 A | 12/1989 | Johnstone et al. |
| 4,890,213 A | 12/1989 | Seki |
| 4,916,329 A | 4/1990 | Dang et al. |
| 4,920,475 A | 4/1990 | Rippel |
| 4,922,125 A | 5/1990 | Casanova et al. |
| 4,926,084 A | 5/1990 | Furutsu et al. |
| 4,943,763 A | 7/1990 | Bobry |
| 4,952,834 A | 8/1990 | Okada |
| 4,954,741 A | 9/1990 | Furutsu et al. |
| 4,975,649 A | 12/1990 | Bobry |
| 4,988,283 A | 1/1991 | Nagasawa et al. |
| 5,010,469 A | 4/1991 | Bobry |
| 5,017,800 A | 5/1991 | Divan |
| 5,027,264 A | 6/1991 | DeDoncker et al. |
| 5,029,285 A | 7/1991 | Bobry |
| 5,057,698 A | 10/1991 | Widener et al. |
| 5,099,410 A | 3/1992 | Divan |
| 5,137,020 A | 8/1992 | Wayne et al. |
| 5,148,043 A | 9/1992 | Hirata et al. |
| 5,154,986 A | 10/1992 | Takechi et al. |
| 5,168,205 A | 12/1992 | Kan et al. |
| 5,172,009 A | 12/1992 | Mohan |
| 5,185,536 A | 2/1993 | Johnson, Jr. et al. |
| 5,193,067 A | 3/1993 | Sato et al. |

(56) References Cited

U.S. PATENT DOCUMENTS

| | | |
|---|---|---|
| 5,198,698 A | 3/1993 | Paul et al. |
| 5,198,970 A | 3/1993 | Kawabata et al. |
| 5,200,586 A | 4/1993 | Smith et al. |
| 5,200,643 A | 4/1993 | Brown |
| 5,220,597 A | 6/1993 | Horiuchi |
| 5,224,025 A | 6/1993 | Divan et al. |
| 5,229,650 A | 7/1993 | Kita et al. |
| 5,237,208 A | 8/1993 | Tominaga et al. |
| 5,241,591 A | 8/1993 | Saji |
| 5,281,919 A | 1/1994 | Palanisamy |
| 5,302,858 A | 4/1994 | Folts |
| 5,334,057 A | 8/1994 | Blackwell |
| 5,400,005 A | 3/1995 | Bobry |
| 5,402,053 A | 3/1995 | Divan et al. |
| 5,410,720 A | 4/1995 | Osterman |
| 5,440,179 A | 8/1995 | Severinsky |
| 5,457,377 A | 10/1995 | Jonsson |
| 5,467,384 A | 11/1995 | Skinner, Sr. |
| 5,483,463 A | 1/1996 | Qin et al. |
| 5,532,525 A | 7/1996 | Kaiser et al. |
| 5,579,197 A | 11/1996 | Mengelt et al. |
| 5,581,246 A | 12/1996 | Yarberry et al. |
| 5,602,462 A | 2/1997 | Stich et al. |
| 5,610,451 A | 3/1997 | Symonds |
| 5,635,773 A | 6/1997 | Stuart |
| 5,638,244 A | 6/1997 | Mekanik et al. |
| 5,642,002 A | 6/1997 | Mekanik et al. |
| 5,664,002 A | 9/1997 | Skinner, Sr. |
| 5,734,831 A | 3/1998 | Sanders |
| 5,739,595 A | 4/1998 | Mekanik et al. |
| 5,745,356 A | 4/1998 | Tassitino, Jr. et al. |
| 5,747,887 A | 5/1998 | Takanaga et al. |
| 5,747,888 A | 5/1998 | Zilberberg |
| 5,760,495 A | 6/1998 | Mekanik |
| 5,768,117 A | 6/1998 | Takahashi et al. |
| 5,783,932 A | 7/1998 | Namba et al. |
| 5,790,391 A | 8/1998 | Stich et al. |
| 5,804,890 A | 9/1998 | Kakalec et al. |
| 5,844,327 A | 12/1998 | Batson |
| 5,880,536 A | 3/1999 | Mardirossian |
| 5,892,431 A | 4/1999 | Osterman |
| 5,897,766 A | 4/1999 | Kawatsu |
| 5,901,057 A | 5/1999 | Brand et al. |
| 5,925,476 A | 7/1999 | Kawatsu |
| 5,961,604 A | 10/1999 | Anderson et al. |
| 5,982,412 A | 11/1999 | Nulty |
| 5,982,645 A | 11/1999 | Levran et al. |
| 5,982,652 A | 11/1999 | Simonelli et al. |
| 5,994,793 A | 11/1999 | Bobry |
| 5,994,794 A | 11/1999 | Wehrlen |
| 6,011,324 A | 1/2000 | Kohlstruck et al. |
| 6,014,015 A | 1/2000 | Thorne et al. |
| 6,028,414 A | 2/2000 | Chouinard et al. |
| 6,069,412 A | 5/2000 | Raddi et al. |
| 6,074,246 A | 6/2000 | Seefeldt et al. |
| 6,100,665 A | 8/2000 | Alderman |
| 6,198,178 B1 | 3/2001 | Schienbein et al. |
| 6,212,081 B1 | 4/2001 | Sakai |
| 6,218,744 B1 | 4/2001 | Zahrte et al. |
| 6,288,456 B1 | 9/2001 | Cratty |
| 6,288,916 B1 | 9/2001 | Liu et al. |
| 6,295,215 B1 | 9/2001 | Faria et al. |
| 6,344,985 B1 | 2/2002 | Akerson |
| 6,348,782 B1 | 2/2002 | Oughton et al. |
| 6,426,610 B1 | 7/2002 | Janik |
| 6,433,905 B1 | 8/2002 | Price et al. |
| 6,456,036 B1 | 9/2002 | Thandiwe |
| 6,465,910 B2 | 10/2002 | Young et al. |
| 6,486,399 B1 | 11/2002 | Armstrong et al. |
| 6,602,627 B2 | 8/2003 | Liu et al. |
| 6,738,435 B1 | 5/2004 | Becker |
| 6,768,722 B1 | 7/2004 | Katseff et al. |
| 6,841,971 B1 | 1/2005 | Spée et al. |
| 6,906,933 B2 | 6/2005 | Taimela |
| 6,933,626 B2 | 8/2005 | Oughton |
| 7,040,920 B2 | 5/2006 | Johnson et al. |
| 7,102,251 B2 | 9/2006 | West |
| 7,182,632 B1 | 2/2007 | Johnson et al. |
| 7,449,798 B2 | 11/2008 | Suzuki et al. |
| 7,543,328 B2 | 6/2009 | Bialk et al. |
| 7,567,520 B2 | 7/2009 | Ostrosky |
| 7,835,379 B2 | 11/2010 | Dravida et al. |
| 8,074,888 B2 | 12/2011 | Naccache |
| 8,344,685 B2 | 1/2013 | Bertness et al. |
| 8,575,779 B2 | 11/2013 | Le et al. |
| 8,616,457 B2 | 12/2013 | Krawczewicz et al. |
| 9,030,045 B2 | 5/2015 | Richardson et al. |
| 9,030,048 B2 | 5/2015 | Heidenreich et al. |
| 9,234,916 B2 | 1/2016 | Peck et al. |
| 9,312,726 B2 | 4/2016 | Heidenreich et al. |
| 9,633,781 B2 | 4/2017 | Le et al. |
| 9,812,900 B2 | 11/2017 | Richardson et al. |
| 2001/0033502 A1 | 10/2001 | Blair et al. |
| 2003/0046706 A1 | 3/2003 | Rakib |
| 2003/0048006 A1 | 3/2003 | Shelter et al. |
| 2004/0031059 A1 | 2/2004 | Bialk et al. |
| 2004/0207366 A1 | 10/2004 | Sung |
| 2005/0096772 A1 | 5/2005 | Cox et al. |
| 2005/0258927 A1 | 11/2005 | Lu |
| 2006/0168612 A1 | 7/2006 | Chapman et al. |
| 2007/0002875 A1 | 1/2007 | Rocci et al. |
| 2007/0262650 A1 | 11/2007 | Li |
| 2008/0024268 A1 | 1/2008 | Wong et al. |
| 2008/0203820 A1 | 8/2008 | Kramer et al. |
| 2008/0278006 A1 | 11/2008 | Gottlieb et al. |
| 2009/0076661 A1 | 3/2009 | Pearson et al. |
| 2009/0196082 A1 | 8/2009 | Mazumder et al. |
| 2009/0240377 A1 | 9/2009 | Batzler et al. |
| 2010/0008397 A1 | 1/2010 | Johnson |
| 2010/0045107 A1 | 2/2010 | Cohen et al. |
| 2010/0161259 A1 | 6/2010 | Kim et al. |
| 2010/0250192 A1 | 9/2010 | Deokar et al. |
| 2010/0324548 A1 | 12/2010 | Godara et al. |
| 2010/0328851 A1 | 12/2010 | Jurek |
| 2011/0187197 A1 | 8/2011 | Moth |
| 2011/0238345 A1 | 9/2011 | Gauthier et al. |
| 2011/0273151 A1 | 11/2011 | Lesso et al. |
| 2012/0051734 A1 | 3/2012 | Weiss et al. |
| 2012/0091811 A1 | 4/2012 | Heidenreich et al. |
| 2012/0127800 A1 | 8/2012 | Heidenreich et al. |
| 2012/0212051 A1 | 8/2012 | Heidenreich et al. |
| 2012/0217800 A1 | 8/2012 | Heidenreich et al. |
| 2012/0217806 A1 | 8/2012 | Heidenreich et al. |
| 2012/0217808 A1 | 8/2012 | Richardson et al. |
| 2013/0113287 A1* | 5/2013 | Singh ............... H02J 3/32 307/46 |
| 2014/0062189 A1 | 3/2014 | Le et al. |
| 2015/0244211 A1 | 8/2015 | Richardson et al. |
| 2017/0229906 A1 | 8/2017 | Le et al. |
| 2018/0062427 A1 | 3/2018 | Richardson et al. |

FOREIGN PATENT DOCUMENTS

| | | |
|---|---|---|
| AU | 2015203667 B2 | 3/2017 |
| CA | 1265231 A | 1/1990 |
| CA | 2033685 A1 | 10/1991 |
| CA | 2036296 A1 | 11/1991 |
| CA | 1297546 C | 3/1992 |
| CA | 2086897 A1 | 7/1993 |
| CA | 2149845 A1 | 12/1995 |
| CA | 2168520 A1 | 8/1996 |
| CA | 2028269 A1 | 1/2000 |
| CA | 2403888 A1 | 9/2001 |
| CA | 2713017 A1 | 7/2009 |
| CA | 2504101 A1 | 5/2010 |
| CA | 2760581 A1 | 11/2010 |
| CN | 101330686 B | 3/2012 |
| DE | 2602789 A1 | 7/1977 |
| DE | 2809514 A1 | 9/1978 |
| DE | 3321649 A1 | 12/1983 |
| EP | 0284541 A2 | 9/1988 |
| EP | 0196004 B1 | 11/1993 |
| EP | 2425515 A2 | 3/2012 |
| EP | 2587620 A2 | 5/2013 |

(56) References Cited

FOREIGN PATENT DOCUMENTS

| | | |
|---|---|---|
| FR | 762789 A | 4/1934 |
| FR | 861215 A | 2/1941 |
| GB | 005201 | 4/1885 |
| GB | 260731 A | 9/1925 |
| GB | 2005118 A | 4/1979 |
| GB | 2120474 A | 11/1983 |
| GB | 2137033 A | 3/1984 |
| GB | 2171861 A | 9/1986 |
| GB | 2185326 A | 10/1986 |
| GB | 2355350 A | 4/2001 |
| GB | 2475612 A | 5/2011 |
| JP | S5482053 A | 6/1979 |
| JP | S5532133 A | 3/1980 |
| JP | S5650417 A | 5/1981 |
| JP | S56155420 A | 12/1981 |
| JP | 2000350381 A | 12/2000 |
| JP | 2001190035 A | 7/2001 |
| JP | 2005295776 A | 10/2005 |
| JP | 2010136547 A | 6/2010 |
| JP | 2010252573 A | 11/2010 |
| KR | 20070108759 A | 11/2007 |
| RU | 2191459 C1 | 10/2002 |
| RU | 2221320 C2 | 10/2004 |
| TW | 200941897 A | 10/2009 |
| TW | I539721 | 6/2016 |
| WO | 8501842 A1 | 4/1985 |
| WO | 0021180 A1 | 4/2000 |
| WO | 2009094540 A2 | 7/2009 |
| WO | 2010135406 A1 | 11/2010 |
| WO | 2011103131 A3 | 12/2011 |
| WO | 2012099911 A1 | 7/2012 |
| WO | 2012148512 A1 | 11/2012 |
| WO | 2012112252 A3 | 1/2013 |
| WO | 2013106356 A1 | 7/2013 |

OTHER PUBLICATIONS

Xia, Ordinary Meter Measures Battery Resistance, EDN-Design Ideas, Jun. 24, 1993, 2 pages.
Yamada, Research and Development of Telecommunications Energy Systems in NTT, NTT Integrated Infromation and Energy Systems Laboratories, Mar. 9, 2011, 8 pages.
Alpha Technologies, Inc., Cheetah CMD-N GS7000 Transponder, 2015, offer for sale 2009, 2 pages.
Alpha Technologies, Inc., Cheetah CMD-N Harmonic Transponder, 2015, offer for sale 2007, 2 pages.
Alpha Technologies, Inc., Cheetah XD Network Tracker Plus, 2015, offer for sale Nov. 2011, 2 pages.
Alpha Technologies, Inc., Power Technical Bulletin DSM3 vs DSM1 Provisioning, Dec. 2010, 4 pages.
Batson et al., Solving the Powering Requirements of Broadband Dial Tone Service, 1994, 3 pages. cited by applicant.
Bridge et al., "Preventing outages without batteries," CED, Jun. 1999, 7 pages.
Broadband Business and News Perspective, "Cable operators feeling power surge," Reprinted from CED, Apr. 2000, 4 pages.
Cheetah Technologies, L.P., Cheetah CMD-N Arris SG4000, 2014, offer for sale Feb. 3, 2011, 2 pages.
Cheetah Technologies, L.P., Cheetah CMD-P+ DOCSIS-based Transponder for Cable Power Systems, 2014, offer for sale 2008, 3 pages.
Cheetah Technologies, L.P., CMD-P+ Transponder User Manual, Mar. 18, 2011, 88 pages.
Contino et al., Water-Cooling Applications for Telecommunications and Computer Energy Systems, Telecommunications Energy Conference, IEEE, 1988, pp. 441-447.
Electroline Equipment Inc., DOCSIS 2.0 and EuroDOCSIS Status Monitoring Transponder for Power Supplies, 2006, 2 pages.
Eto et al., Research, Development, and Demonstration Needs for Large-Scale, Reliability-Enhancing, Integration of Distributed Energy Resources, IEEE Proceedings of the 33rd Hawaii International Conference on System Sciences, 2000, 7 pages. cited by applicant.
H.C. Gerdes et al., A Practical Approach to Understanding Ferroresonance, EEE-Circuit Design Engineering, pp. 87-89, Apr. 1966.
Hart et al., The Derivation and Application of Design Equations for Ferroresonant Voltage Regulators and Regulated Rectifiers, IEEE Transactions on Magnetics, vol. MAG-7, No. 1, Mar. 1971, pp. 205-211.
Hitron Technologies Inc., DNP-30341 DOCSIS-Based Downstream Monitor, Sep. 2012, 2 pages.
IEEE Standard for Ferroresonant Voltage Regulators, Electronics Transformer Technical Committee of the IEEE Power Electronics Society, IEEE Std. 449-1990, May 16, 1990, 29 pages. cited by applicant.
IMEON Energy, "IMEON 3.6 User Guide", no date, 20 pages.
IMEON Energy, "Self Consumption Smart Grid Inverter", 2016, 3 pages.
IMEON Energy, "Self Consumption Smart Grid Inverter", no date, 2 pages.
IMEON Energy, "The Self Consumption Smart Grid Inverter New Generation", no date, 8 pages.
International Search Report, PCT/US99/19677, dated Feb. 8, 2000, 5 pages. cited by applicant.
International Searching Authority, "PCT/US2011/025000", International Search Report, dated Oct. 26, 2011, 9 pages. cited by applicant.
International Searching Authority, "PCT/US2011/025000," International Search Report, dated Oct. 26, 2011, 9 pages.
International Searching Authority, "PCT/US2012/021619", International Search Report, dated May 17, 2012, 7 pages. cited by applicant.
International Searching Authority, ISR, PCT/US2012/021622, dated May 17, 2012, 7 pages.
International Searching Authority, PCT Notification of Transmittal of the International Search Report and the Written Opinion of the International Searching Authority, or the Declaration, dated Dec. 8, 2016, 8 pages.
Ivensys, "Power When You Really Need It!" Publication No. CSG29FXA, Feb. 2000, 2 pages.
Ivensys, "Sometimes Less Is More!" Publication No. CSG28FXA, Feb. 2000, 2 pages.
Jain et al., High Frequency Tripod UPS Topologies for Emerging Fiber Networks, Telecommunications Energy Conference, IEEE, 1998, pp. 505-512.
Jefferson T. Mitchell et al., Rectifiers and Energy Conservation, Telecommunications, Mar. 1979, 3 pages.
Kakalec, "A Feedback-Controlled Ferroresonant Voltage Regulator," IEEE Transactions of Magnetics, Mar. 1970, 5 pages, vol. Mag-6, No. 1.
Lectro Products Incorporated, "Lectro Ferro Family," Publication No. CSGI6FXA, Nov. 1998, 4 pages.
Lectro Products Incorporated, "Solving CATV Power Solutions," Publication No. CSG24FYA, Jun. 1999, 12 pages.
Marcotte et al., "Powering Cable TV Systems," Reprinted from Broadband Systems & Design, Jun. 1996, 4 pages.
Marcotte, "Power migration strategies for future-proofing," Reprinted from CED Magazine, Jun. 1997, 4 pages.
McGraw-Hill, Dictionary of Scientific and Technical Terms Fifth Edition, p. 745 and pp. 1696-1697, 1994. cited by applicant.
Multipower, Inc., "Confluence Newsletters, vols. I and II," "MP 900," "MP1350," web site http://www.multipowerups.com/index.htm, Aug. 2000, 16 pages.
NEDAP, "Data sheet fro 24 Vdc lead-acid batteries, PowerRouter Solar Battery the innovative all-in-one-unit", no date, 2 pages.
NEDAP, "Installation Manual PowerRouter Solar Inverter", Jan. 9, 2013, 46 pages.
NEDAP, "Installer Manual PowerRouter Solar Inverter", Jan. 9, 2013, 46 pages.
NEDAP, "PowerRouter Connect, Technical data", no date, 1 page.
NEDAP, "PowerRouter Solar, Technical data", no date, 1 page.
Phoenix Broadband Technologies, L.L.C., Installation & Operation Manual, 2005, 44 pages.

(56) References Cited

OTHER PUBLICATIONS

Rando, AC Triport—A New Uninterruptible AC Power Supply, Telephone Energy Conference, IEEE, 1978, pp. 50-58.
Rex Teets, Application and Design of Ferroresonant Transformers, No Date, pp. 28-34. cited by applicant.
Robert J. Kakalec et al., New Technology for Battery-Charging Rectifiers, Bell Laboratories Record, May 1979, pp. 131-134. cited by applicant.
Smart Powershop/Smart Energy Systems International AG, "Off-Grid SMA Power Set XS," Sep. 29, 2010, 5 pages.
Spears, "Disturbances Can Toast Your System," Reprint from Communications Technology, Apr. 2000, 4 pages.
Stewart Nowak, Power Problems: Selecting a UPS, Electronics Test, Jul. 13, 1990, 4 pages, No. 7, San Francisco, CA, US. cited by applicant.

\* cited by examiner

POWER CONTROL SYSTEMS AND METHODS

RELATED APPLICATIONS

This application claims benefit of U.S. Provisional Patent Application Ser. No. 62/217,958 filed Sep. 13, 2015, currently pending.

The contents of the related application(s) listed above are incorporated herein by reference.

TECHNICAL FIELD

The present invention relates to systems and methods for the control of energy production, storage, consumption, and export management, and more particularly, to a power control system for supplying power to a load based on at least one of at least one DC power source and at least one AC power source.

BACKGROUND

Modern concerns for the environment have driven consumer demand for sustainable renewable energy production and storage technologies. For example, renewable energy sources such as wind and solar have resulted in increased demand for wind-powered turbine and photovoltaic (PV) array consumer technologies. Such demand has driven the availability and advancement in efficiency of sustainable renewable energy solutions, providing the consumer market with a multiplicity of technology options. Additionally, recent advancements in energy storage technology have presented the consumer market with a multiplicity of energy storage solutions for storing power generated from renewable energy sources and/or other sources.

Due to the dynamic nature of these emerging markets and the lack of standardization of renewable power generation and storage systems, consumers are left with a multiplicity of non-standardized renewable power generation technologies and non-standardized power storage technologies. As such, consumers are left without a simple, cost effective means to integrate consumer operated power generation systems, consumer operated energy storage systems, and/or the utility power grid.

Accordingly, there exists a need for a power control system capable of integrating one or more of renewable energy generation technologies, energy storage technologies, and/or the utility power grid.

SUMMARY

The present invention may be embodied as a power supply configured to be operatively connected to at least one load. The power supply comprises an AC bus operatively connected to the load, a first AC power source operatively connected to the AC bus, a DC bus, a DC/AC converter operatively connected between the DC bus and the AC bus, a first DC power source, and a load balancer operatively connected between the first DC power source and the DC bus. The power supply operates in a first mode in which power is supplied to the load from the first AC power source through the AC bus and in a second mode in which power is supplied to the load from the first DC power source through the DC bus, the DC/AC converter, and the AC bus.

The present invention may also be embodied as a power control system to operatively connect at least first and second AC power sources and at least first and second DC power sources to at least one load. The power control system comprises an AC bus operatively connected to the load, a DC bus, a DC/AC converter operatively connected between the DC bus and the AC bus, a first DC/DC converter operatively connected between the first DC source and the DC bus, a second DC/DC converter operatively connected between the second DC power source and the DC bus, a load balancer operatively connected to at least one of the first and second DC/DC converters, a first control switch operatively connected between the DC/AC converter and the AC bus, a second control switch operatively connected between the first AC power source and the AC bus, and a third control switch operatively connected between the second AC power source and the AC bus.

The present invention may also be embodied as a method of supplying power to at least one load comprising the steps of: operatively connecting an AC bus to the load; operatively connecting a first AC power source to the AC bus; providing a DC/AC converter to convert voltages between the DC bus and the AC bus; operatively connecting a load balancer between a first DC power source and the DC bus; and operating the power supply in a first mode in which power is supplied to the load from the first AC power source through the AC bus; and a second mode in which power is supplied to the load from the first DC power source through the DC bus, the DC/AC converter, and the AC bus.

The present invention may be implemented as a power control system comprising a multiplicity of integrated circuit controlled DC and AC components which control the flow, inversion, storage, consumption and export of power. The power control system comprises of a neutral point clamping DC to AC inverter that inverts AC power signals being supplied by a plurality of AC power sources into a DC power signal and inverts DC power signals being supplied by a plurality of DC power sources into an AC power signal. A load balancing circuit is incorporated into the power control system to balance loads of unknown characteristics that are connected to the power control system. A plurality of DC converters are used to generate a plurality of output DC power signals from a plurality of DC power sources, before the DC to AC inverter inverts the DC power signal into an AC power signal to supply power to one or more loads. Converted DC power signals may also be used to supply power to at least one or more connected DC energy storage device. A plurality of AC power supplies, inclusive of the utility power grid or another AC power generator may be connected to the power control system to supply an AC power signal for supplying the one or more loads directly, or for inversion into a DC power signal to supply power to at least one or more connected DC energy storage device. One or more relay switches is provided to operatively connect one or more of the attached AC power supplies to the power control system and to operatively connect the DC stage of the power control system to the AC stage of the power control system.

A power control system implementing the present invention may further comprise control software for controlling which of the integrated circuit controlled DC components of the power control system shall assert control over the DC bus and for controlling which of the relay switches are closed to operatively connect one or more of the attached AC power supplies and/or to operatively connect the DC stage of the power control system to the AC stage of the power control system.

A power control system implementing the present invention may further comprise control software for controlling the output AC power signal of the power control system for synchronizing the subject output AC power signal of the power control system with AC power signal of one of the operatively connected AC power supplies.

A power control system implementing the present invention may further comprise another layer of logic based on consumer use model scenarios to determine which AC or DC power sources to operatively connect to provide optimal production, storage, consumption and exportation of energy in compliance with the consumer's desires. Such logic may be based upon environmental, economic, power control system component status and other factors including, but not limited to: renewable energy source output, life cycle of DC energy storage device, cost of utility power grid consumption, AC power supply generator fuel, size and/or capacity of various components of the power control system and time of year and/or day.

The present system is designed to provide efficient uninterrupted transition from multiple DC and AC inputs to supply power to one or more loads of unknown characteristics, to charge one or more DC energy storage devices, such as batteries, and to export energy to the utility power grid.

DETAILED DESCRIPTION

The basic concept of the present invention may be embodied in any one of a number of configurations. An example embodiment of the present invention will be described below, with the understanding that this embodiment illustrates the scope of the present invention but is not intended to be an exhaustive description of all scenarios in which the present invention may be used. In addition, not all components of the example embodiment described below are needed to implement the present invention in a more basic form.

Figure 1:
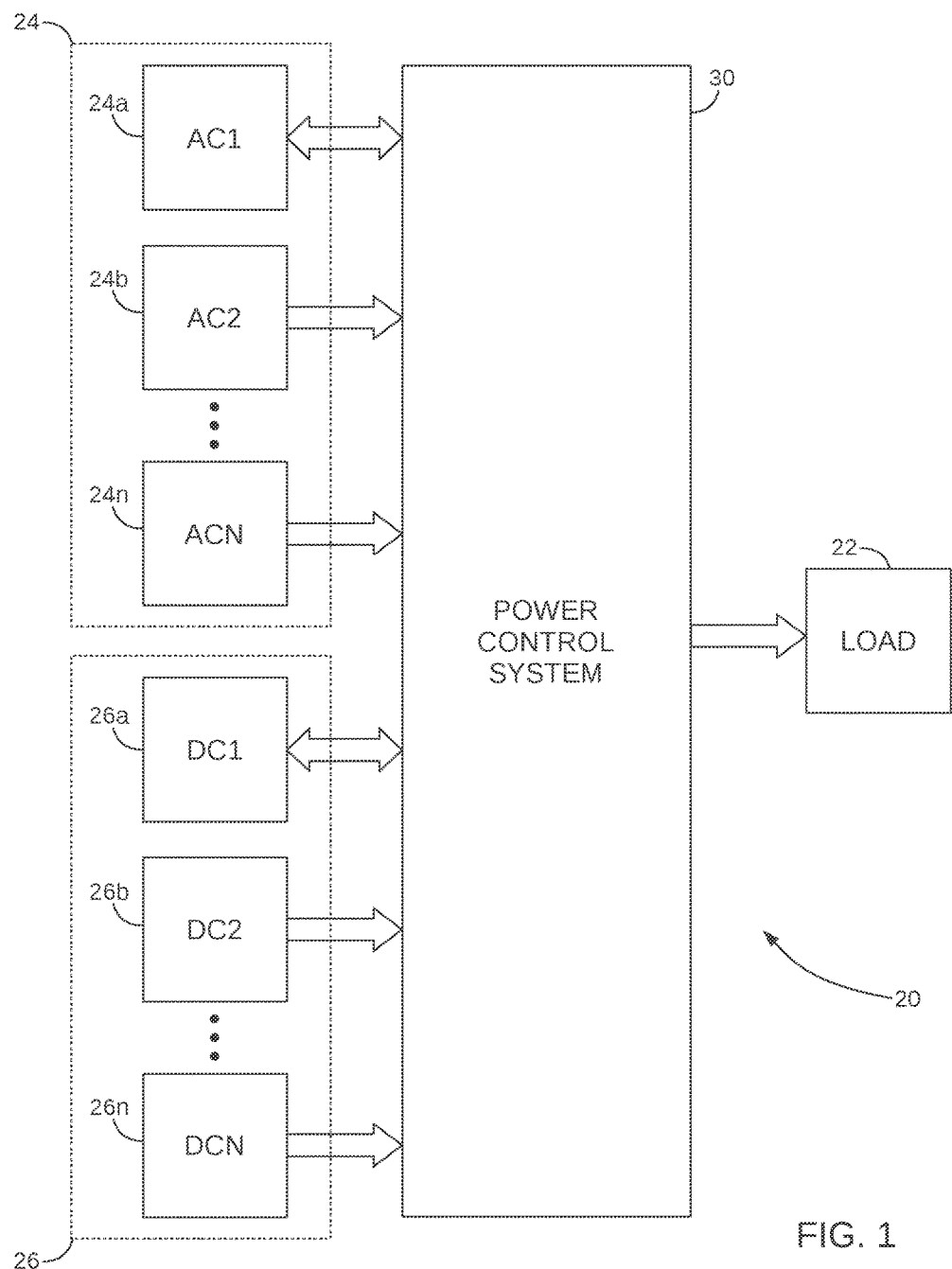
FIG. 1 is a highly schematic block diagram representation of the scalability and modularity of the present invention, depicting the attachment of a plurality of AC power sources, a plurality of DC power sources, and a load.

Referring initially to FIG. 1, depicted therein is a first power supply system 20 constructed in in accordance with, and embodying, the principles of the present invention. The example power supply system 20 supplies a load power signal to a load 22. The example power supply system 20 contains at least one electrical component that consumes electric power operated based at least in part on the load power signal generated by the power supply system 20.

The characteristics of at least some of the electric components forming the example load 22 are typically unknown, the load 22 may be imbalanced. In particular, in a single phase electric power signal a load is considered balanced when the current flowing through each conductor is approximately equal. A load is considered imbalanced when the current flowing through one conductor is greater than the current flowing through the other conductor. When a load is unbalanced, power transmission can be inefficient under certain circumstances.

As represented in FIG. 1, the example power supply system 20 comprises a power control system 30 and at least one AC power source 24a, 24b, through 24n and/or at least one DC power source 26a, 26b, and 26n.

The example power control system 30 is configured to generate the load 22 power signal based on at least one of the AC power sources 24a, 24b, through 24n and/or at least one of the DC power sources 26a, 26b, through 26n. Furthermore, the power control system 30 is configured to transfer energy from at least one of a multiplicity of AC power sources 24 and/or DC power sources 26 for storage in at least one DC power sources 26, as represented in the bi-directional power flow arrow associated with the first DC power source 26a. Finally, the power control system 30 is configured to export energy from at least one of a multiplicity of DC power sources 26 to at least one of a multiplicity of AC power sources, as represented by the bi-directional power flow arrow associated with the first AC power source 24a.

Figure 2:
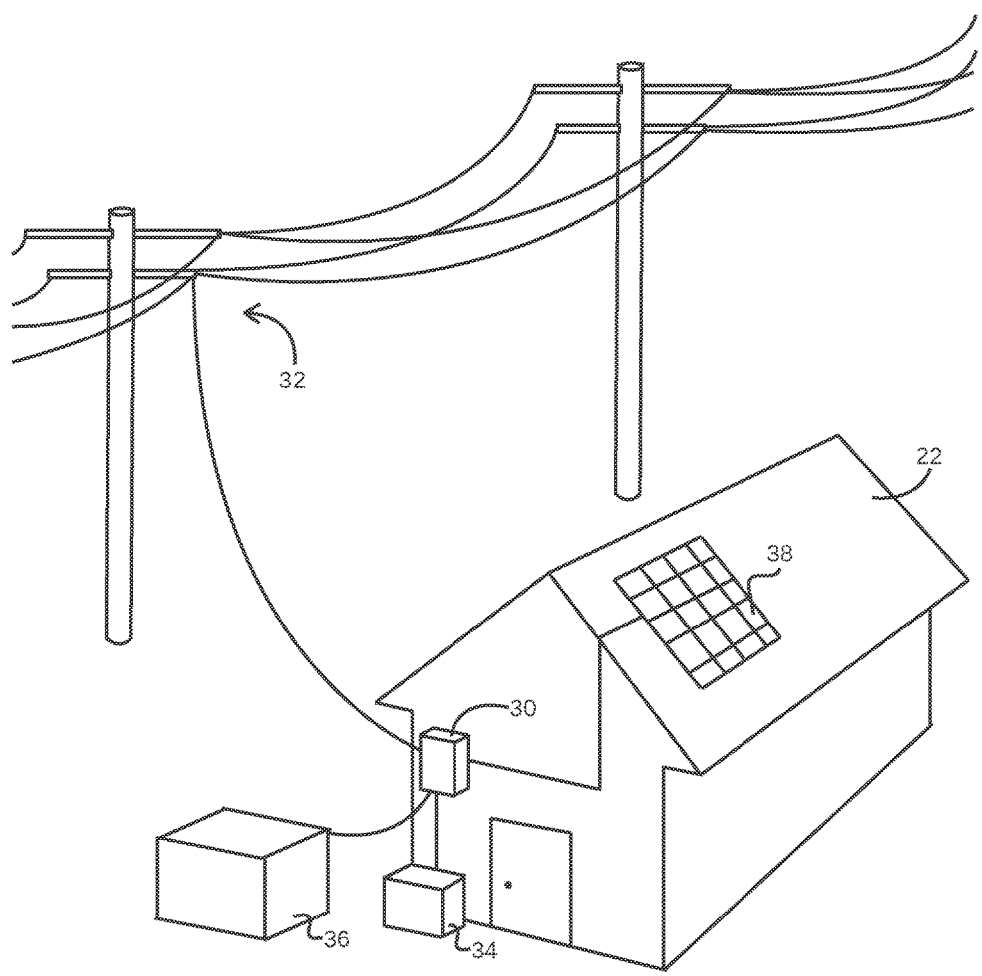
FIG. 2 is a three dimensional (3D) representation of an example environment in which a power control system constructed in accordance with the present invention may be used.

Referring now to FIG. 2, a specific example of the example power supply system 20 constructed in accordance with, and embodying, the principles of the present invention will now be described. As depicted in FIG. 2, the load 22 to which the first example power supply system 20 supplies a load power signal is represented by a house. When the load 22 is formed by a house as shown in FIG. 2, the load 22 will contain numerous electronic devices that operate at least in part based on the load power signal generated by the power supply system 20. Further, at least some of the electronic devices forming the load 22 may result in the load being imbalanced.

As depicted in FIG. 2, the example power control system 30 is connected to a utility grid 32 (depicted in FIG. 2 as utility power lines) forming a first AC power source, an energy storage system 34 forming a first DC power source, an AC power system 36 formed by a second AC power source, and a DC power generation system 38 forming a second DC power source. The example energy storage system 34 comprises at least one battery and will also be referred to herein as the battery 34. The example second AC power system 36 is or may be a conventional AC generator having an internal combustion engine and will be referred to herein as the generator 36. The example DC power generation system 38 is a photovoltaic array and will also be referred to herein as the PV system 38. Other types of energy storage systems, AC power systems, and/or DC power systems may be used instead of or in addition to the utility grid 32 and example power storage and generation systems 34, 36, and 38 described herein.

The example power control system 30 is configured to generate the load power signal based on at least one of the utility power grid 32, the battery 34, the generator 36, and the PV system 38. In addition, the power control system 30 may charge the battery from at least one of the utility power grid 32, the generator 36, and the PV system 38. The example power control system 30 may further be optimized to select an appropriate one of the first and second AC power sources 32 and 36 and DC power sources 34 and 38 based on factors such as availability and cost.

Figure 3:
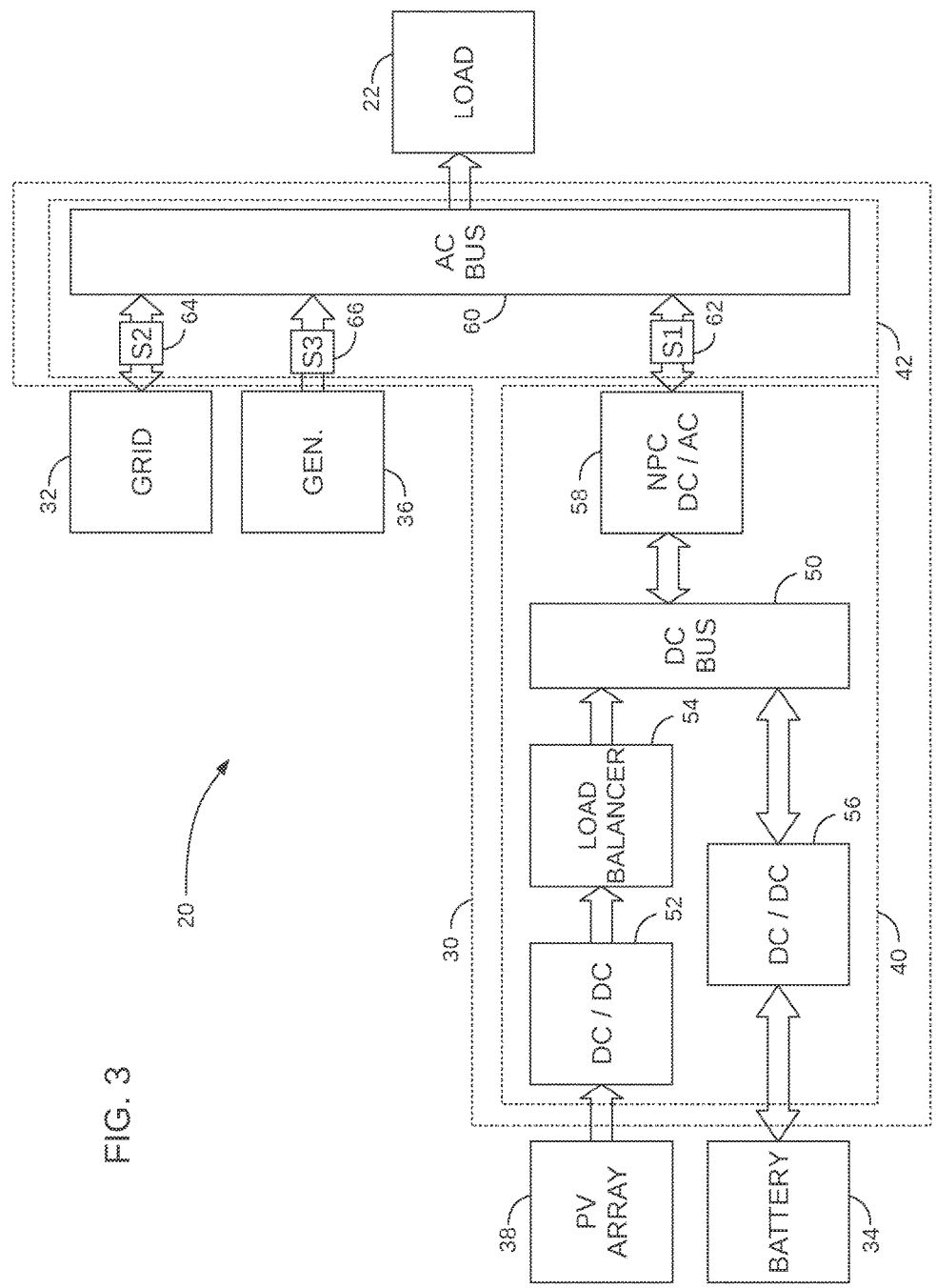
FIG. 3 is a schematic block diagram depicting an example power control system configured in accordance with the present invention.

Referring now to FIG. 3, depicted therein at 30 is a block diagram depicting an example of the power control system 30 generally described above. FIG. 3 illustrates that the example power control system 30 comprises a DC stage 40 and an AC stage 42. The DC stage 40 comprises a DC bus 50, a first DC/DC converter 52, a load balancer 54, a second DC/DC converter 56, and a DC/AC converter 58. The first DC/DC converter 52 is connected between the PV system 38 and the load balancer 54. The load balancer 54 connects the first DC/DC converter 52 to the DC bus 50. The second DC/DC converter 56 is connected between the battery 32 and the DC bus 50. The AC stage 42 comprises an AC bus 60, a first control switch 62, a second control switch 64, and a third control switch 66. The first control switch 62 is operatively connected between the DC/AC converter 58 of the DC stage 40 and the AC bus 60 of the AC stage 42. The second control switch 64 is operatively connected between the grid 32 and the AC bus 60. The third control switch 66 is operatively connected between the generator 36 and the AC bus 60.

The example first DC/DC converter 52, second DC/DC converter 56, and DC/AC converter 58 all are or may be conventional and will not be described herein in detail beyond what is necessary for a complete understanding of the present invention. In particular, the DC/DC converters 52 and 56 each convert a DC power signal from one DC voltage to another DC voltage. The DC/AC converter 58 converts an AC signal into a DC voltage. The example second DC/DC converter 56 and the example DC/AC converter 58 are both bidirectional.

Figure 4:
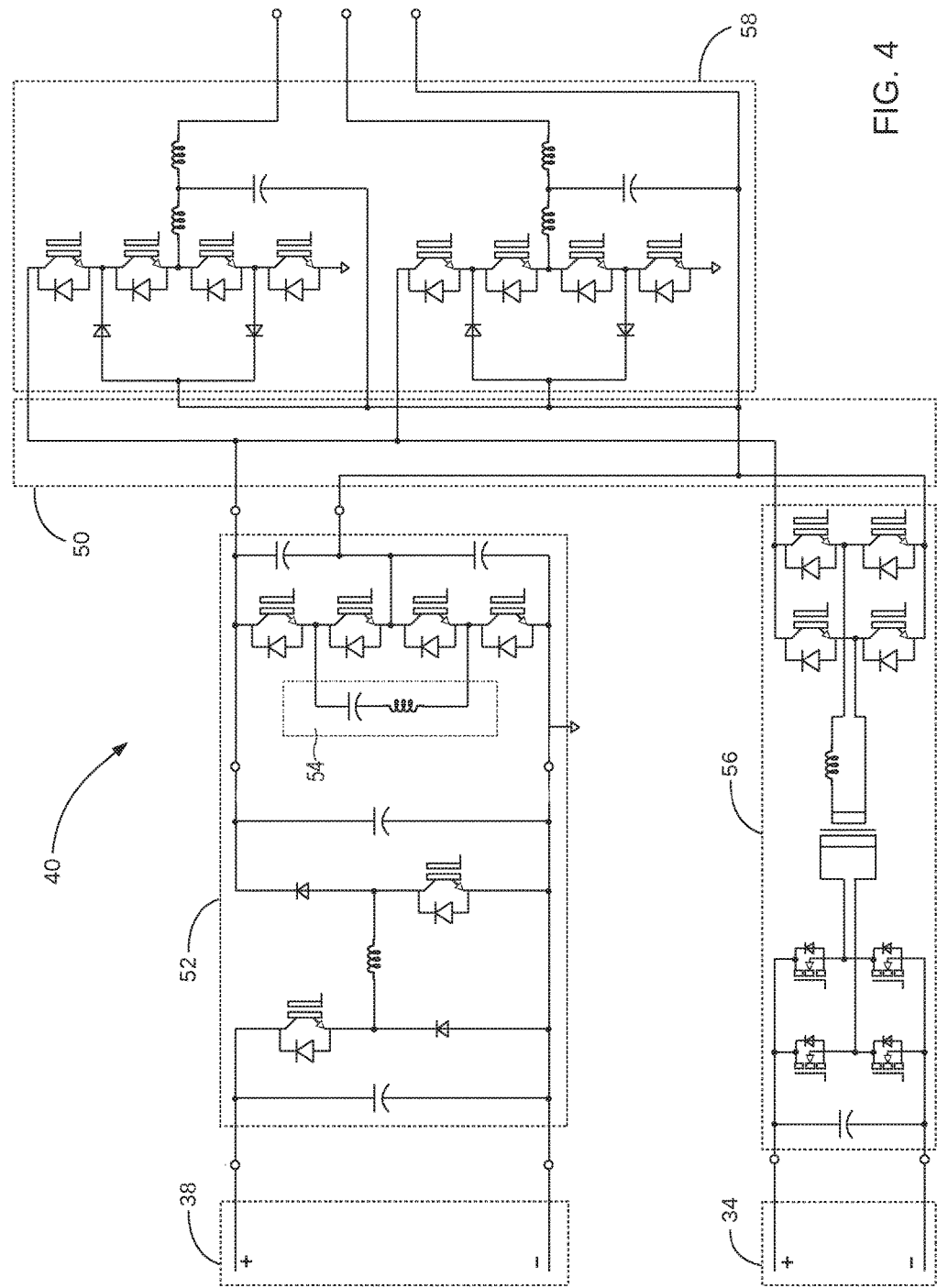
FIG. 4 is a detailed circuit diagram depicting the details of the DC stage of the example power control system shown in FIG. 3.
Figure 5:
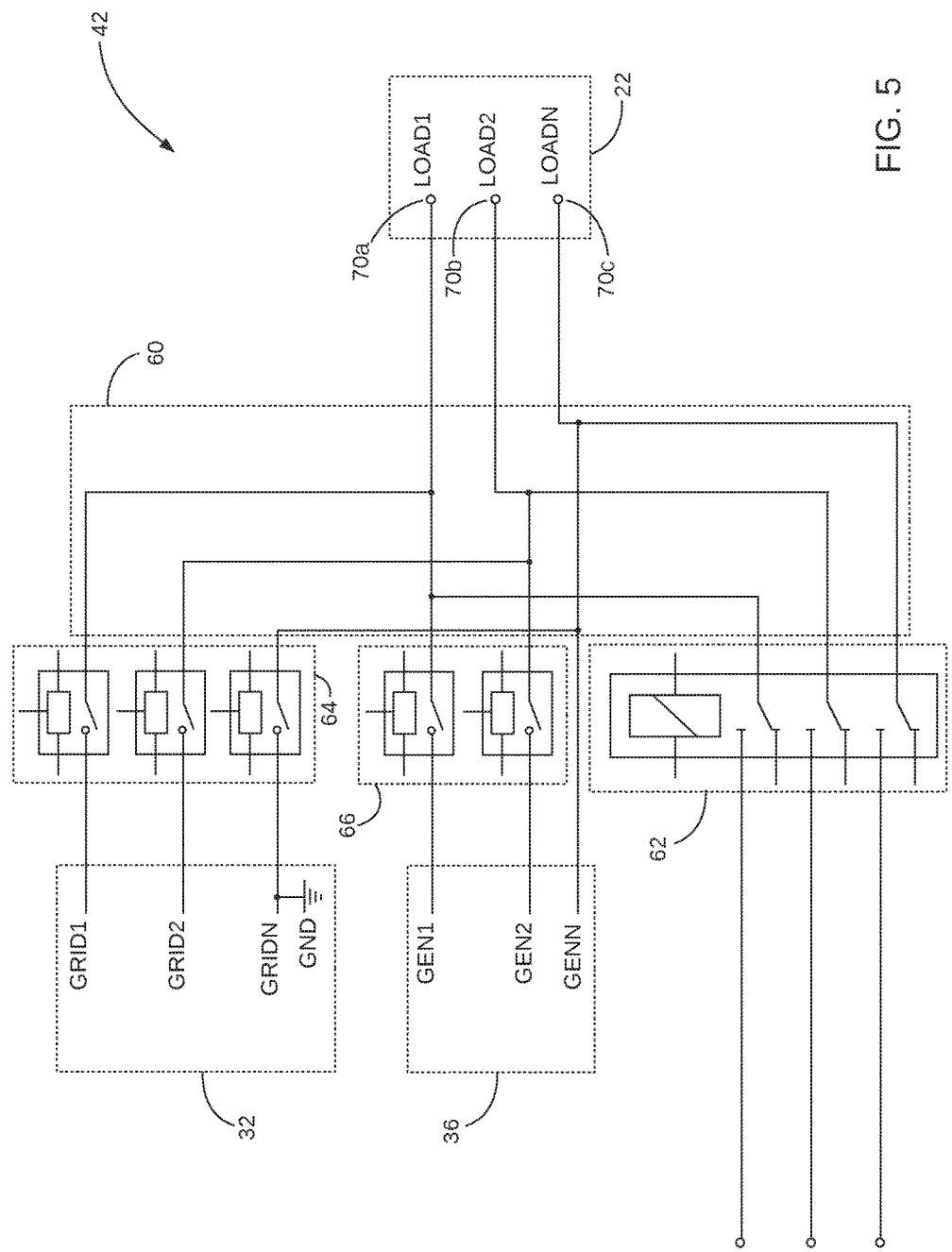
FIG. 5 is a detailed circuit diagram depicting the details of the AC stage of the example power control system shown in FIG. 3.
Figure 6:
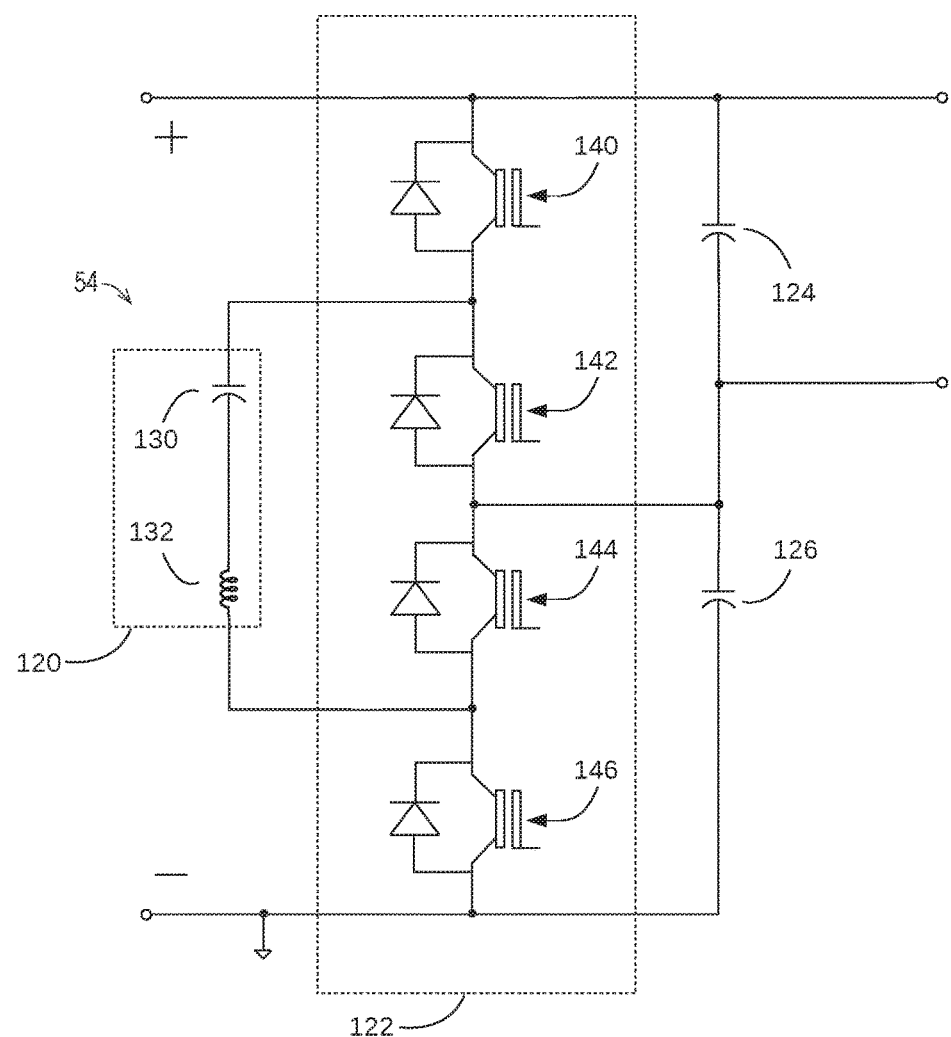
FIG. 6 is a detailed circuit diagram depicting the details of the example load balancer 54 shown in FIGS. 3 and 4.

FIG. 4-6 illustrate an example circuit capable of implementing the functionality of the example power control system 30 described herein. FIG. 4 illustrates an example of the DC stage 40, while FIG. 5 illustrates an example of the AC stage 42. FIG. 6 is a detailed view of a portion of the example DC stage 40.

As depicted in FIG. 4, the example DC/DC converter 52 converts a PV output voltage associated with the example PV system 38 into a DC bus voltage. In particular, the example PV system 38 generates a PV output voltage within a first range, and the example first DC/DC converter 52 converts this PV output voltage to positive and negative DC voltages relative to a ground. The positive DC signal is connected to the DC bus 50 through the load balancer 54. The output of the PV system 38 is thus effectively converted to the DC bus voltage on the DC bus 50. As depicted in FIG. 4, the example first DC/DC converter 52 is a BB component 252 converter.

The example DC/DC converter converts a battery voltage associated with the example battery 34 into the DC bus voltage. As depicted in FIG. 4, the example battery 34 generates a battery DC signal of a first DC value, and the DC/DC converter 56 converts the battery DC signal into the DC bus voltage. The DC/DC converter applies this voltage to the DC bus 50. The example DC/DC converter 56 is bidirectional and is capable of converting the DC bus voltage to a DC battery voltage appropriate for charging the example battery 34. As depicted in FIG. 4, the example second DC/DC converter 56 is a dual active bridge (DAB).

The example DC/AC converter 58 converts a DC voltage on the DC bus 50 into an AC power signal appropriate for powering the load 22. As shown in FIG. 4, the DC/AC converter 58 is capable of converting the DC bus voltage present on the example DC bus 50 into an AC power signal that is applied to the AC bus 60. The example DC/AC converter 58 is bidirectional. Accordingly, the DC/AC converter may convert a AC bus voltage present on the AC bus 60 to the DC bus voltage and supply this DC bus voltage to the DC bus 50.

FIGS. 4 and 5 illustrates that the example DC/AC converter 58 may be operatively connected to the AC bus 60 when the example first control switch 62 is in a closed configuration and is disconnected from the AC bus 60 when the example first control switch is in an open configuration. The example first control switch 62 as depicted in FIG. 5 is formed by one or more electromechanical relays, but other switch circuits may be used in addition or instead.

FIG. 5 also illustrates that the AC bus 60 may be operatively connected to the utility power grid 32 when the example second control switch 64 is in a closed configuration and is disconnected from the power grid 32 when the example second control switch 64 is in an open configuration. FIG. 5 further illustrates that the example second control switch 64 is formed by one or more electromechanical relays, but other switch circuits may be used in addition or instead.

FIG. 5 further illustrates that the example AC power source generator 36 is operatively connected to the AC bus 60 when the example third control switch 66 is in a closed configuration and is disconnected from the AC bus 60 when the example third control switch 66 is in an open configuration. As shown in FIG. 5, the example third control switch 66 is formed by one or more electromechanical relays, but other switch circuits may be used in addition or instead.

FIG. 5 further illustrates that the example power control system 30 defines load terminals 70a, 70b, and 70c. The load terminals 70a, 70b, and 70c are operatively connected to the AC bus 60. The load terminals 70a, 70b, and 70c allow the AC bus 60 of the example power control system 30 to be connected to the load 22 and thus allow a load power signal output from the example power control system 30 to be supplied to the load 22.

When the example first control switch 62 is in its closed configuration, the DC/AC converter 58 is operatively connected to the AC bus 60. With the DC/AC converter 58 is operatively connected to the AC bus 60, power may be transferred in either direction between the DC bus 50 and the AC bus 60 through the example bidirectional DC/AC converter 58. With the example second control switch 64 is in its closed configuration, the grid 32 is operatively connected to the AC bus 60. When the grid 32 is operatively connected to the AC bus, power from the grid 32 can be transferred from the grid 32 to the load 22 or to the battery 34, or power from the battery 34, the generator 36, and/or the PV system 38 can be transferred to the grid 32. When the example third control switch 64 is in its closed configuration, the generator 36 is operatively connected to the AC bus 60. When the generator 36 is operatively connected to the AC bus 60, power from the generator 36 can be transferred from the generator 36 to the load 22, to the grid 32, and/or to the battery 34.

FIG. 4 further illustrates that the output of the PV system 38 is connected to the first DC/DC converter 52 at a first DC input terminal 80a and a second DC input terminal 80b. The first DC/DC converter 52 is in turn connected to the load balancer 54 at a first DC intermediate terminal 82a and a second DC intermediate terminal 82b. The load balancer 54 is in turn connected to the DC bus 50 at a first DC bus terminal 84a and a second DC bus terminal 84b.

The battery 34 is connected to the second DC/DC converter 56 at a first battery terminal 86a and a second battery terminal 86b. The second DC/DC converter 56 is connected to the DC bus 50 at the first DC bus terminal 84a and the second DC bus terminal 84b.

The example DC/AC converter 58 is connected between the first DC bus terminal 84a and the second DC bus terminal 84b and a first intermediate AC terminal 90a and a second intermediate AC terminal 90b. The second DC bus terminal 84b is connected to an intermediate reference terminal 92. As shown in FIG. 5, the intermediate AC terminals 90a, 90b, and 92 are connected to the AC bus 60 through the first control switch 62.

The load 22, the grid 32, the generator 36, and the DC/AC converter 58 are all connected to one another by their respective line 1, line 2 and neutral wires to form the example AC bus 60. In particular, line 1 of the load 22, line 1 of the grid 32, line 1 of the generator 36 and the first intermediate AC terminal 90a are all connected to each other. Line 2 of the load 22, line 2 of the grid 32, line 2 of the generator 36 and the second intermediate AC terminal 90b are all connected to each other. The neutral of the load 22, the neutral of the grid 32, the neutral of the generator 36, and the intermediate reference terminal 92 are all connected to each other.

Referring now to FIG. 6 is an example of a detailed circuit diagram of the example load balancer 54. In the example depicted in FIG. 6, the example load balancer 54 comprises a balance circuit 120. The balance circuit 120 is configured across a portion of a switch circuit 122 and first and second split rail capacitors 124 and 126 of the first DC/DC converter 52. The example balance circuit 120 is an inductor-capacitor (LC) resonant charge pump circuit comprising a resonant capacitor 130 and a resonant inductor 132. The example switch circuit 120 comprises a first transistor 140, a second transistor 142, a third transistor 144, and a fourth transistor 146.

The example first DC/DC converter 52 formed by the switch circuit 122 and the split rail capacitors 124 and 126 is or may be conventional and will not be described herein beyond that extend necessary for a complete understanding of the present invention. In particular, the first transistor 140 is connected to the DC bus 50 and to the second transistor 142. The second transistor 142 is connected to the third transistor 144. The fourth transistor 146 is connected to the second transistor 144 and the DC bus 50. The first rail capacitor 124 is connected to the DC bus 50 and between the second and third transistors 142 and 144. The second rail capacitor 126 is connected between the second and third transistors 142 and 144 and to the DC bus 50. The juncture of the first and second rail capacitors 124 and 126 is also connected to the DC bus.

The example balance circuit 120 is connected to the example first DC/DC converter 52 as follows. The resonant capacitor 130 and resonant inductor 132 are connected in series with the resonant capacitor 130 connected to a point between the first and second transistors 140 and 142 and the resonant inductor 132 connected to a point between the third and fourth transistors 144 and 146. When the example switch circuit 120 is operated in a conventional manner such that the example first DC/DC converter 52 functions as a buck-boost converter, the switches 140, 142, 144, and 146 forming example first DC/DC converter 52 are operated at predetermined inverter switching frequency, typically at or near a duty cycle of 50% during normal operation. With the balance circuit 120 connected to the example first DC/DC converter 52 as described above, the values of the resonant capacitor 130 and resonant inductor 132 will determine a balancer frequency and a balancer duty cycle associated with the balance circuit 120.

In operation, the example load balancer 54 effectively maintains an equal voltage across the first split rail capacitor 124 and the second split rail capacitor 126. In particular, the balance circuit 120 is sequentially connected in parallel across the split rail capacitors 124 and 126 during normal operation of the example first DC/DC converter 52. The balance circuit 120 will, effectively, take energy from either of the capacitors 124 and 126 at a higher voltage and give energy to either of the capacitors 124 and 126 at a lower voltage. By maintaining substantially equal voltages across the first split rail capacitor 150 and the second split rail capacitor 152, the example load balancer 54 substantially compensates for imbalances in the load 22.

In the example balance circuit 120, the values of the resonant capacitor 130 and the resonant inductor 132 are selected such that the balancer frequency and balancer duty cycle substantially match the inverter frequency and inverter duty cycle. The balance circuit 120 thus allows the load balancer 54 to operate with the example first DC/DC converter 52 at nearly zero voltage switching, rendering the operation of the balance circuit 120 highly efficient.

The switches 62, 64, and 66 of the example power control system 30 may be operated in different switch configurations. In a first example switch configuration, the second control switch 64 is in the open configuration, the third control switch 66 is in the open configuration, and the first control switch 62 is in the closed configuration. When the switches 62, 64, and 66 are in this first example switch configuration, the power control system 30 is operating in an off-grid mode in which the grid 32 and the generator 36 are disconnected from the AC bus 60 and the DC/AC converter 58 is operatively connected to the AC bus 60. In the off-grid mode, one or both of the PV system 38 and the battery 34 may supply power to the load 22. Should the power output from the PV system 38 exceed the power demands of the load 22, power from the PV system 38 may be used to charge the battery 34.

In a second switch configuration, the second control switch 64 is closed and the third control switch 66 is open. In this second switch configuration, the example power control system 30 operates in a grid-tied mode in which the grid 32 is operatively connected to the AC bus 60 and the power supply generator 36 is disconnected from the AC bus 60. In the grid-tied mode, the power control system 30, can either supply the power demands of the load 22 directly where the first control switch 62 is open, or, where the first control switch 62 is closed and the DC/AC converter 58 is thereby operatively connected to the AC bus 60, either the grid 32 can supply power to, and thereby charge, the example battery 34, or the example PV system 38 can export power to the grid 32.

In a third switch configuration, the second control switch 64 is open and the third control switch 66 closed. As such, the grid 32 is not operatively connected to the AC bus 60, but the power supply generator 36 is operatively connected to the AC bus 60, and the power control system 30 is operating in a generator mode. In a generator mode, as in this example, the power control system 30, can either supply the demands of the load 22 directly where the first control switch 62 is open, or, where the electromechanical relay switch 62 is closed and the DC/AC converter 58 is thereby operatively connected to the AC bus 60, the generator 36 can supply power to, and thereby charge, the example battery 34.

Figure 7:
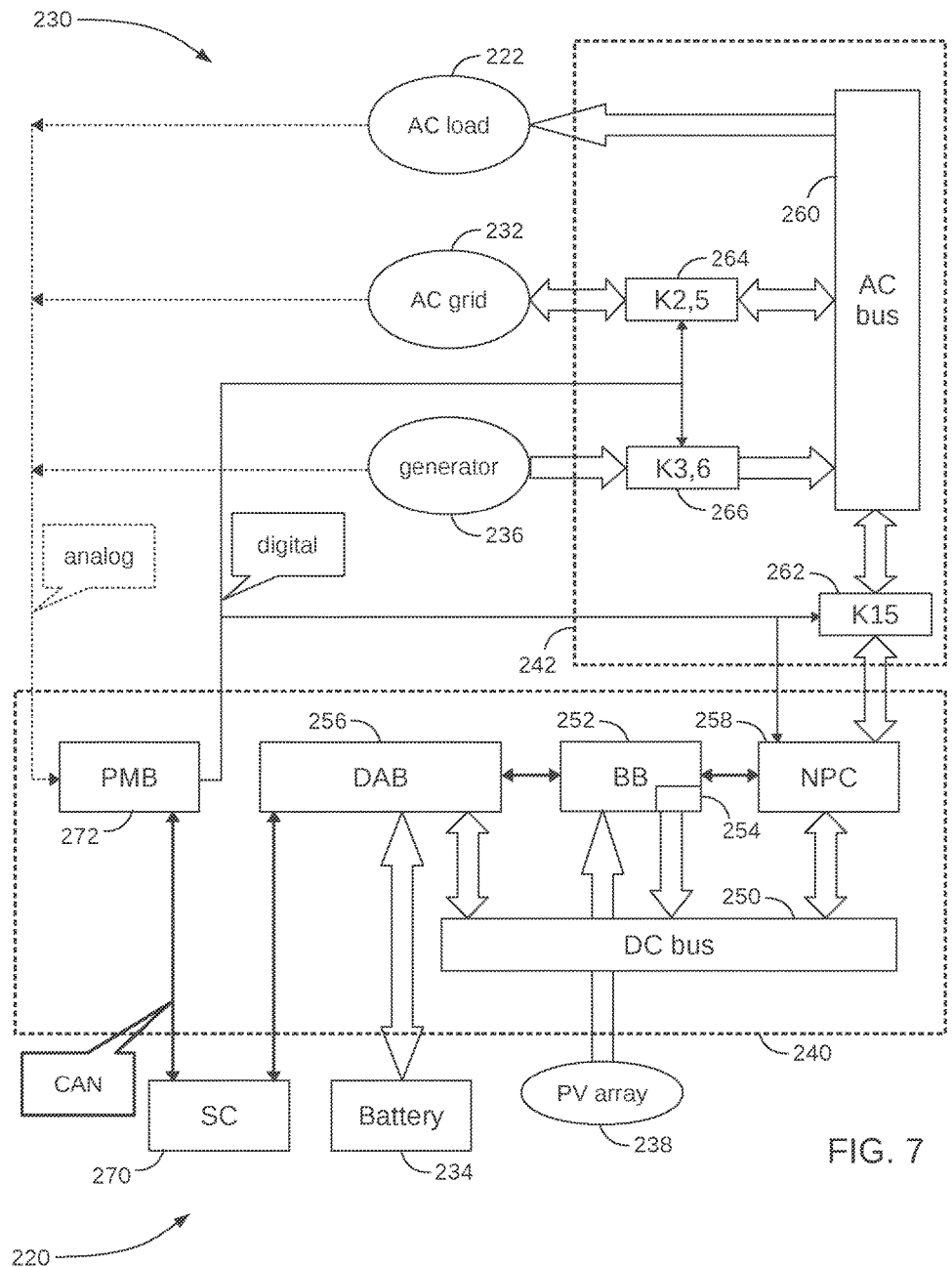
FIG. 7 is a schematic block diagram depicting a second example power control system configured in accordance with the present invention and to include the communications network between the integrated circuit controllers and to represent the analog and digital output signals of the example power control system.

Referring now to FIG. 7 of the drawing, depicted therein is a second example power system 220 of the present invention. The example power system 220 is configured to provide power to a load 222.

The example power system 220 comprises a power control system 230 operatively connected to a utility grid 232, a battery system 234, a generator 236, and a PV array 238. The example power control system 230 comprises a DC portion 240 and an AC portion 242.

The DC portion 240 comprises a DC bus 250, a buck-boost (BB) component 252 converter (BB component) 252, a load balancer 254, a dual active bridge (DAB component) 256, and a neutral-point-clamp (NPC) 258. The example BB component 252 is formed by a non-isolated DC to DC converter for controlling power from, for example, the PV array 238 to the DC bus 250. The example load balancer 254 is or may be similar to the load balancer 54 described above. The example dual active bridge (DAB) 256 comprises an isolated DC to DC converter that controls power flow between the DC bus 250 and the battery 234. The example neutral-point-clamp (NPC) 258 comprises an AC inverter that controls power flow between the DC bus 250 and the AC load 222.

The AC portion 242 comprises an AC bus 260 and first, second, and third control switches 262, 264, and 266. The example power control system 230 further comprises a system controller 270 and a power metering board (PMB) 272.

The example power control system 230 further comprises a system controller (SC) 270 for providing user interface, BMS, and connectivity functionality and a power metering board (PMB) 272 for providing high resolution voltage & current sensors and AC power relay control.

All of the controllers are interconnected using a controller area network (CAN) 274. The example BB component 252, dual active bridge 256, neutral-point-clamp 258, and example power metering board 272 are connected to coordinate operation of the example power control system 230. In the example power control system 230, the cabling is daisy chained from example power metering board 272 to example system controller 270 to example dual active bridge 256 to example BB component 252 to example neutral-point-clamp 258. This cabling also contains two isolated, open-drain signals that may be used to indicate an interprocessor emergency condition.

As described herein the example power control system 230 performs, at minimum, the following functions.

The neutral-point-clamp 258 provides seamless transition from grid-tied operation to stand-alone mode. Using two different control modes requires a transition time among all three converters (dual active bridge 256, neutral-point-clamp 258, buck boost system 252) and the AC grid 232. Transition from grid-tied to stand-alone mode and vice versa requires a very short interrupt to be able to transit from on-grid to off-grid operation. The example power control system 230 uses a droop control method system to operate under the same control mode for both grid-on and grid-off without any need of transitioning between the modes. The neutral-point-clamp 258 can also be configured to transition from synchronous generators.

The example power control system 230 employs a minimum loss control algorithm for buck and boost operation of a positive output BB component 252 converter. In particular, the example power control system 230 employs a control method can that allows buck and boost operation to be performed separately while also providing positive output voltage. This control method changes from buck to boost operation and vice versa smoothly to prevent instability in the control loop. Use of this control algorithm improves the efficiency of the BB component 252 at least by 1% and possibly up to 2%.

The example power control system 230 employs a battery constant voltage charge algorithm to control a BB component 252 converter. The battery constant voltage charge algorithm is control algorithm that enables the system to charge the batteries 234 when connected to the dual active bridge 256, under constant voltage mode by controlling the BB component 252 converter connected to PV panels under the off-grid operation. The dual active bridge 256 will be in constant high voltage DC bus control mode and the BB component 252 will inject current to control the battery voltage. The loop can be created in either the BB component 252 to dual active bridge 256 communication or the system controller 270 can run the loop as well.

The example power control system 230 employs a control algorithm for pre-charging a common DC bus from multiple sources. The pre-charging control algorithm enables the system 230 to charge a common DC bus from multiple sources. The BB component 252 and the dual active bridge 256 can both pre-charge the DC bus 250. The algorithm runs the BB component 252 in constant voltage mode at a lower voltage than the dual active bridge 256 constant voltage mode. This allows both the BB component 252 and the dual active bridge 256 to operate together without communication interaction.

The example power control system 230 uses PV power to recharge and offset grid consumption and contains an option to cycle the batteries. The example power control system 230 has the ability to not export to the grid under any circumstance, to export only in lieu of curtailment, to export up to a preset output limit, or to export whenever possible, as much as possible. The example power control system 230 uses auto-sensing to pool resources, support shared loads, share surplus, and use power surpluses against battery deficits. The example power control system 230 provide DC coupled generation and AC coupled generation with Frequency-Watt control (e.g, SunSpec) and other advanced grid benefits (var support, power factor correction, ancillary support). Internal communication is automatic and provides presets & custom options. External communication is easily accessible and controlled from Web interface via Ethernet.

The example power control system 230 employs frequency-watt control to limit active power generation or consumption when the line frequency deviates from nominal by a specified amount. There are two approaches available for frequency-watt control: the parameter approach and the curve approach.

As distributed generation transitions from being an outlier technology to being a key partner in the operation and balance of a well-behaving utility grid, inverters will increasingly be called upon to provide ancillary benefits to the grid—either by mandate, or to support advanced business opportunities. As such, the platform needs to support advanced grid benefit functionalities such as those called out by the Western Utilities Smart Inverter Working Group (SIWG). These functions include VAR support to supply reactive power to the grid, power factor correction (static or active) and other ancillary benefits.

The example power control system 230 is configured to operate in a diverse set of use-case scenarios simple for each region, language, various utility requirements and different battery technologies. The example control system 230 is an all in one, four port plug and play device utilizing a connectorized installation system. The example control system 230 employs auto-sensing inverters in a parallel system and allows selection of regional grid connection parameters. The example control device includes battery technology presets with full charging algorithms options.

With the foregoing general understanding of the example power control system 230 in mind, the details of the example power control system 230 will now be described.

The example power control system 230 employs different modes depending upon operating requirements. When the battery is discharging, the inverter performs automatic load management to maximize the run time of critical loads. Without an external critical load panel, the example power control system 230 implements any combination of two modes to increase the available run time by dropping certain loads: drop 240V load mode, protected load mode, or drop 240 v mode and protected load mode.

The drop 240V load mode occurs while the inverter is operating on battery power and the state-of-charge is sufficient to operate the connected loads in a split-phase configuration (i.e., AC power is produced on two 120 v phases 180 degrees out of phase of each other). 120V Loads on L1 and L2 operate from their respective phases and any 240 v loads connected between L1 and L2 are powered. Once the battery 234 discharges below a user preset level, or SOC, L1 and L2 phase references, which are normally 180 degrees out of phase, are both connected to L1. That will put both L1 and L2 AC outputs in phase and drop any 240V loads. The phase difference of L2 may be shifted slowly until it is in phase with L1, or it may be done by dropping ½ cycle.

Alternatively, in a drop L1 or L2 mode, either L1 or L2 can be designated as the priority phase. In this case, once the battery discharges below user preset level (level2), the priority phase remains on, and the non-priority phase turns off. The priority phase maintains output until the low battery threshold, or minimum State of charge (SOC), is reached, at which point the priority phase is turned off. Once the battery is recharged, normal operation resumes and both phases are reset to their default state.

In the protected load mode, the generator input may be used as a load control switched output when an inverter is used without a generator. Critical loads are connected to the LOAD terminals of the inverter. Any other loads are connected to the generator (GEN) terminals. So long as the battery 234 maintains a minimum state of charge, loads connected to the GEN terminals are operated normally. Once the battery level drops below a user preset level, the GEN terminals disconnect, shedding the loads connected thereto. At this point, only critical loads connected to the LOAD terminals will be maintained.

In the drop 240v mode and protected load mode, both of these modes are combined to allow loads to be shed depending upon user requirements.

Figure 8:
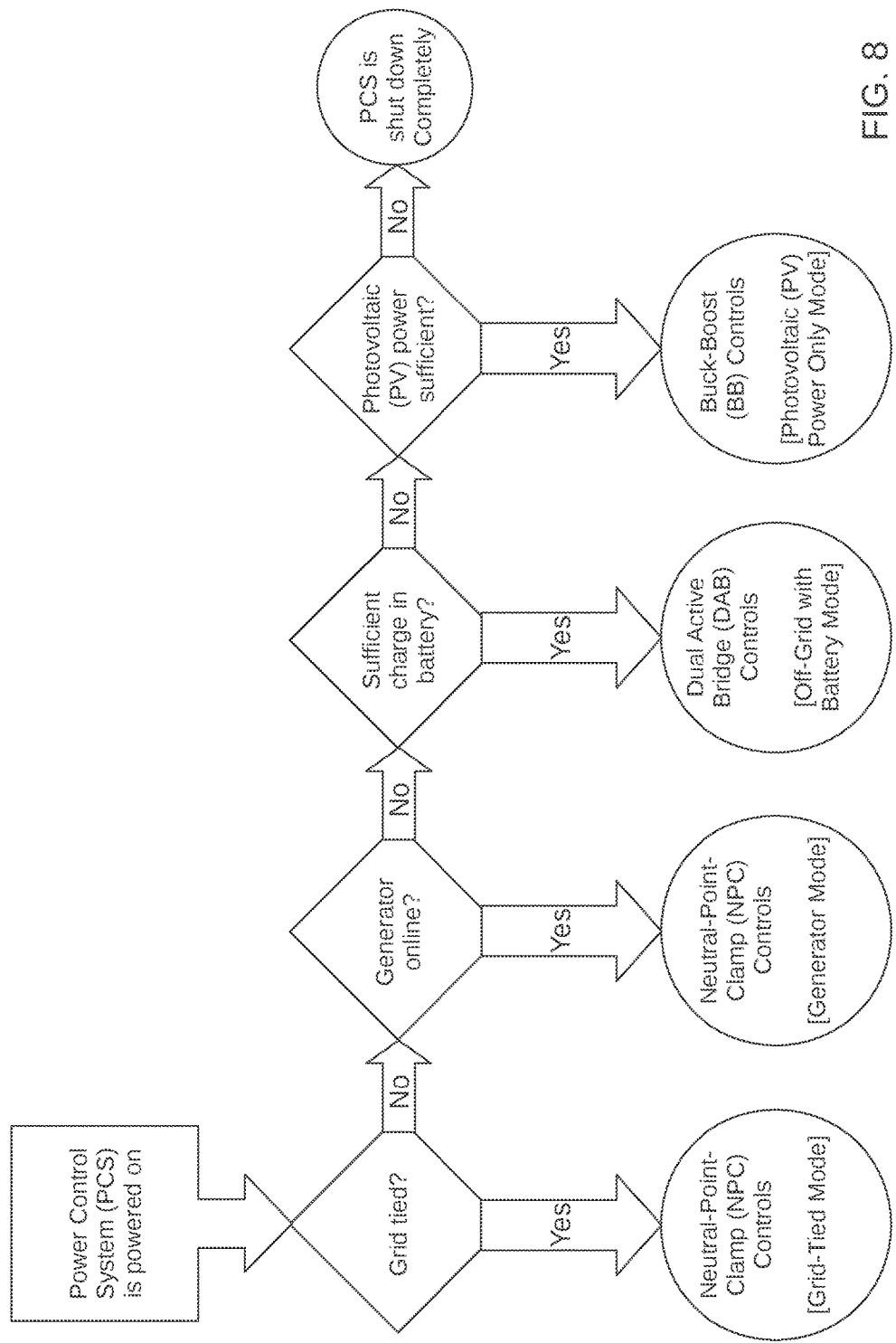
FIG. 8 is a highly schematic flow chart representing an example of logic used to implement a method of selecting which integrated circuit controller shall assert control over the DC bus depicted in FIGS. 3 and 4.
Figure 9:
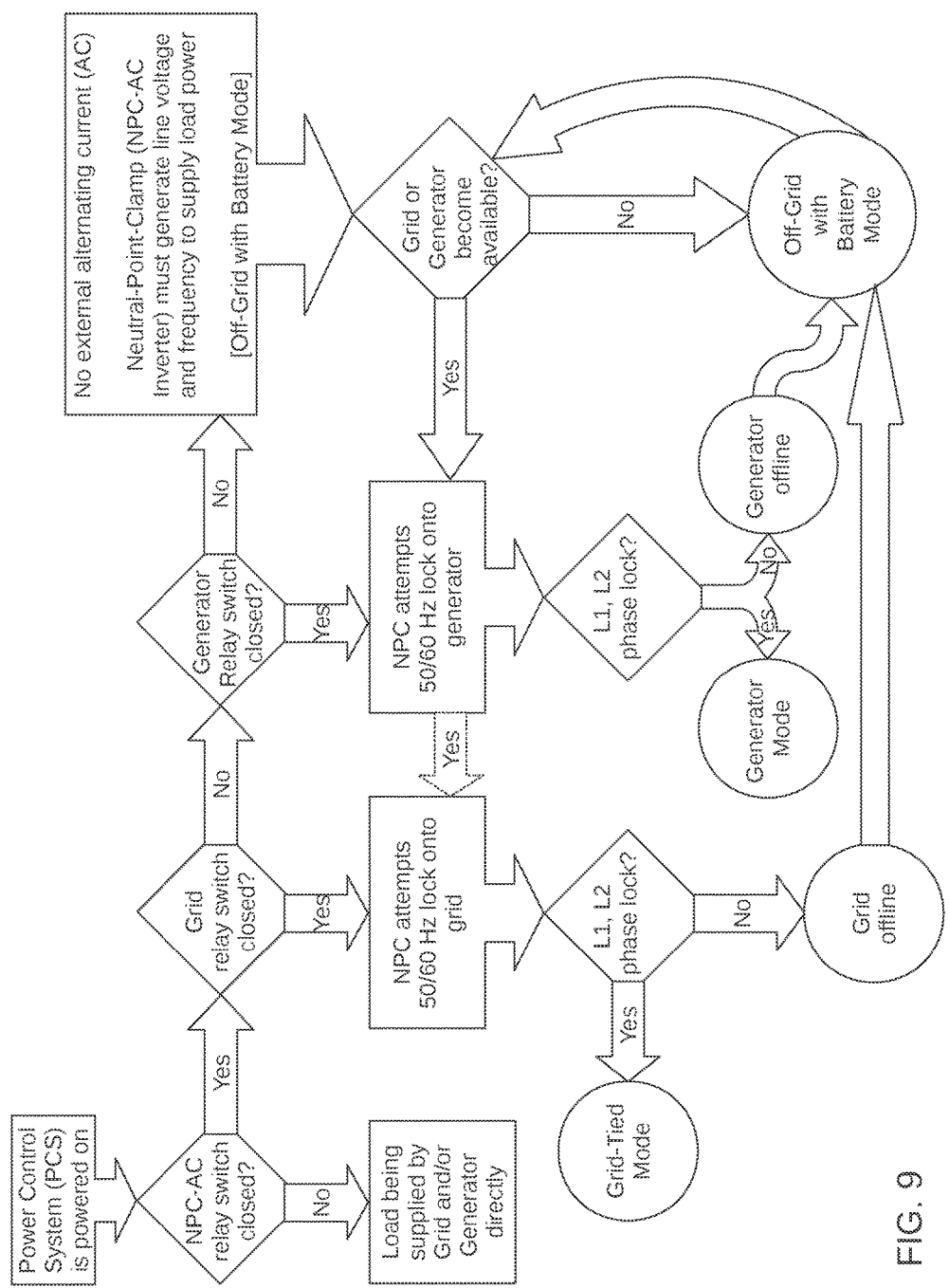
FIG. 9 is a highly schematic flow chart representing an example of logic used to implement a method of synchronizing the output AC power signal from the present invention with external AC power supplies and/or a load.

Each of the example controllers will now be described in further detail. As example of the logic that may be implemented by the controller portion of the example power control system 230 is depicted in FIGS. 8 and 9.

The example system controller 270 provides a method to start and stop the example power control system 230. The example system controller 270 provides the battery management system (state of charge, charging mode, etc.). The example system controller 270 starts and stops the generator 236. The example system controller 270 acquires data from each of the example power control system 230 controllers connected to the example controller area network 274. The example system controller 270 provides a method to update the firmware embedded within each of the controllers via the example controller area network 274.

The example power metering board 272 reads high resolution analog voltage and current sensors that are used to measure the power transferred to/from the grid 232 and from the generator 236 and to the load. The example power metering board 272 also outputs four digital zero-cross signals directly to the example neutral-point-clamp 258 that are used to synchronize the off-grid AC output to the grid/generator prior to relay closure. Lastly, the example power metering board 272 controls the AC power interconnection relay (K15) 60 for the example neutral-point-clamp 258, generator 236 (K3,K6), and grid 232 (K2,K5).

The example BB component 252 transfers power from the PV array 238 to the DC bus 250. The example BB component 252 can regulate the DC bus voltage whenever:

1. the example power control system 230 is NOT grid-tied, and
2. the battery 234 state of charge is insufficient, and
3. the available PV power meets or exceeds the load power.

The example dual active bridge 256 can transfer power from the battery 234 to the DC bus 250 (discharge), or the example dual active bridge 256 can transfer power to the battery 234 from the DC bus 250 (charge). The example dual active bridge 256 can regulate the DC bus 250 voltage whenever:

1. the example power control system 230 is NOT grid-tied, and
2. the battery 234 state of charge is sufficient.

Depending on the battery 234 state of charge and the grid/generator state, the example system controller 270 determines when and how the example dual active bridge 256 charges the battery 234.

The example neutral-point-clamp 258 can transfer power from an AC source (grid or generator) to the DC bus 250, or the example neutral-point-clamp 258 can transfer power from the DC bus 250 to the AC grid 232 and load 222. The example neutral-point-clamp 258 can regulate the DC bus 250 voltage whenever the example power control system 230 is grid-tied. The example neutral-point-clamp 258 can regulate the AC load voltage whenever the example power control system 230 is NOT grid-tied.

DC Bus Voltage Control

At the heart of the power control system 230 is the high voltage DC bus 250. The DC bus 250 is used to exchange power between the various sources and loads. Exactly one of the power control system 230 elements may control the DC bus voltage at any given moment. The particular choice is dependent on:

grid 232 status
generator 236 status
battery 234 state
PV system 238 state

When grid-tied, the example neutral-point-clamp 258 controls the DC bus 250 by pulling/pushing power from/to the AC grid 232.

When off-grid AND generator 236 is running, the example neutral-point-clamp 258 controls the DC bus 250 by pulling power from the generator 236.

When off-grid AND generator 236 is offline AND the battery 234 contains sufficient charge, the example dual active bridge 256 controls the DC bus 250 by pulling/pushing power from/to the battery 234. The battery 234 state of charge is determined by the example system controller 270.

When off-grid AND generator 236 is offline AND battery 234 is empty AND the PV system 238 power is insufficient, the power control system 230 is completely shut-down and disconnected until manually reset by the example system controller 270.

Synchronization

Grid

When K15 262 is closed AND K2+K5 264 is closed, the example neutral-point-clamp 258 attempts to lock onto the grid 50/60 hz line voltage frequency. If the example neutral-point-clamp 258 has established phase lock with both L1 and L2, the power control system 230 is grid-tied. Otherwise, the power control system 230 is off-grid. The example power metering board 272 controls the relays.

Generator

When K15 262 is closed AND K3+K6 266 is closed, the example neutral-point-clamp 258 attempts to lock onto the generator 50/60 hz line voltage frequency. If the example neutral-point-clamp 258 has established phase lock with both L1 and L2, the generator 236 is running. Otherwise, the generator 236 is offline. The example power metering board 272 controls the relays.

No AC Source

As generally shown in FIG. 7, when K15 262 is closed and K2+K3+K5+K6 (264 and 266) are open, the example neutral-point-clamp 258 has no external AC source to lock onto, so the example neutral-point-clamp 258 must generate the AC line voltage and frequency. When either the grid or generator AC sources become available, the example neutral-point-clamp 258 must resynchronize to the AC source before reconnecting it. Only after the example neutral-point-clamp 258 has re-synchronized to the digital sync signals provided by the PMB+relay board can K3+K6 266 or K2+K5 264 be safely closed.

PCS Operating Mode

Grid-Tied

The generator 236 is disconnected (K3+K6 266 open) and the grid is connected (K2+K5 264 closed) in grid-tied mode. While in this mode the example neutral-point-clamp 258 regulates the DC bus voltage by importing/exporting power from/to the grid, and the example BB component 252 injects maximum power from the PV array 238 into the DC bus 250. The example dual active bridge 256 may consume some of the DC bus 250 power in order to charge the battery 234. If the net-zero mode is enabled, the example BB component 252 component 252 limits the injected power to match the AC load 222+battery 234 power so that no power is exported.

If/when the grid is lost, the power control system 230 operating mode automatically switches to off-grid with battery mode.

Off-Grid with Battery

Both AC sources (grid and generator 236) are disconnected (K2+K3+K5+K6 264 and 266 open) in off-grid with battery mode. While in this mode the example dual active bridge 256 regulates the DC bus 250 voltage by either charging or discharging the battery 234, and the example neutral-point-clamp 258 regulates the load voltage. The example BB component 252 will usually inject maximum power from the PV array 238 into the DC bus 250. Any PV power in excess of the load 222 demand will be charged into the battery 234. The example BB component 252 must limit the power injected to the DC bus 250 to be no more than the power demanded by the load 222 plus the power being charged into the battery 234.

If/when the AC grid 232 is restored, the example neutral-point-clamp 258 must synchronize the AC output with the digital sync signals generated by the example power metering board 272 to match the grid 232. Once the AC output is locked, the example power metering board 272 can reconnect the grid 232 (K2+K5 264 closed). Once the relay is closed, the example neutral-point-clamp 258 will lock onto the actual grid line voltage (analog rather than digital), and the power control system 230 operating mode automatically switches to grid-tied mode.

If/when the generator 236 is available, the example neutral-point-clamp 258 must synchronize the AC output with the digital sync signals generated by the example power metering board 272 to match the generator 236. Once the AC output is locked, the example power metering board 272 can reconnect the generator 236 (K3+K6 266 closed). Once the relay is closed, the example neutral-point-clamp 258 will lock onto the actual generator 236 line voltage (analog rather than digital), and the power control system 230 operating mode automatically switches to generator mode.

If/when the battery 234 is depleted and/or cannot support the AC load 222, the power control system 230 must shutdown and disconnect (K15 262 open) until manually reset.

Generator

The grid 232 is disconnected (K2+K5 264 open), and the generator 236 is connected (K3+K6 266 closed) in generator mode. While in this mode the example neutral-point-clamp 258 locks onto the generator line voltage and regulates the DC bus 250 voltage. The generator power is consumed directly by the load 222, but any excess power available from the generator 236 and PV system 238 can be charged into the battery 234 by the example dual active bridge 256. The example BB component 252 must limit the PV array 238 power injected such that no power is exported.

If/when the battery 234 is fully charged OR if/when the grid 232 is restored OR if the generator 236 is unavailable, the operating mode automatically switches to off-grid with battery mode.

TABLE 1

Relay configuration

| Grid K2, K5 | Gen K3, K6 | NPC K15 | operating mode |
|---|---|---|---|
| 0 | 0 | 0 | no power distributed |
| 0 | 0 | 1 | offgrid with battery |
| 0 | 1 | 0 | generator to load only, PCS off |
| 0 | 1 | 1 | generator to battery + load |
| 1 | 0 | 0 | bypass: load = grid, PCS off |
| 1 | 0 | 1 | grid-tied |
| 1 | 1 | 0 | Destructive |
| 1 | 1 | 1 | Destructive |

There are 8 possible relay configurations. One does not transfer power, two may be destructive, two of the configurations have the power control system 230 disconnected, and the remaining three modes are useful:
- offgrid with battery
- generator
- grid-tied Inner-Processor Communications The CAN message (data frame) is defined by the CAN 2.0b specification and contains three main sections: header, payload, and trailer.

1. header contains three sections: start, arbitration, and DLC.
    1.1. start
    1.2. arbitration contains four sections: ID, SRR, IDE and RTR, and uses the extended data frame.
        1.2.1. ID is 29-bit message identifier and contains 5 usable fields, not including reserved bits.
            1.2.1.1. b28-b27: PRIORITY=0 (not currently used).
            1.2.1.2. b26-b23: TO=destination ID:
                {ALL=0,PMB=1,NPC=2,SC=3,DAB=4,BB=5}.
            1.2.1.3. b22-b19: FROM=source ID:
                {ALL=0,PMB=1,NPC=2,SC=3,DAB=4,BB=5}.
            1.2.1.4. b18-b17: TYPE
                1.2.1.4.1. GET=0: request the value of a parameter.
                1.2.1.4.2. SET=1: assign the value of a parameter.
                1.2.1.4.3. REPLY=2: report the value of a parameter.
            1.2.1.5. b16-b9: reserved
            1.2.1.6. b8-b0: PARAM
                1.2.1.6.1. 0-0x1F: common to all Sikorsky controllers.
                1.2.1.6.2. 0x20-0x1FF: specific to each Sikorsky controller.
        1.2.2. SRR=Substitute Remote Request (not currently used).
        1.2.3. IDE=Identifier Extension (=1: 29-bit ID).
        1.2.4. RTR=Remote Transmission Request (not currently used).
    1.3. DLC=Data Length Code=number of bytes in payload section.
2. payload=0-8 bytes, defined by paramID (see tables 2-5).
3. trailer
    3.1.1. CRC=Cyclic Redundancy Check
    3.1.2. ACK=acknowledge
    3.1.3. end Set The SET type message is used by the sender to assign a parameter value on the receiver.

Get

The GET type message is used by the sender to request the value of a parameter from the receiver. The receiver responds to a GET message with a STATUS message.

Reply

The REPLY type message is sent in response to a GET message, but it can be sent asynchronously (without a GET message) by the sender to the receiver.

Given the foregoing, it should be apparent that the principles of the present invention may be embodied in forms other than those described above. The scope of the present invention should thus be determined by the claims to be appended hereto and not the foregoing detailed description of the invention.

What is claimed is:

1. A power supply configured to be operatively connected to at least one load, comprising:
    an AC bus operatively connected to the load;
    a first AC power source operatively connected to the AC bus;
    a DC bus;
    a DC/AC converter operatively connected between the DC bus and the AC bus;
    a first DC power source; and
    a load balancer operatively connected between the first DC power source and the DC bus; wherein
    the power supply operates in
        a first mode in which power is supplied to the load from the first AC power source through the AC bus; and
        a second mode in which power is supplied to the load from the first DC power source through the DC bus, the DC/AC converter, and the AC bus.

2. A power supply as recited in claim 1, in which the load balancer substantially equalizes the charge on first and second split rail capacitors.

3. A power supply as recited in claim 1, in which the load balancer comprises a resonant capacitor and a resonant inductor connected in series.

4. A power supply as recited in claim 2, in which load balancer comprises a balance circuit that is alternately connected between the first and second split rail capacitors.

5. A power supply as recited in claim 4, in which the balance circuit is included in a DC/DC converter, in which the balance circuit is alternately connected between the first and second split rail capacitors at a frequency and duty cycle that substantially matches a frequency and duty cycle of the DC/DC converter.

6. A power supply as recited in claim 4, in which the balance circuit is alternately connected between the first and second split rail capacitors such that the load balancer operates with nearly zero voltage switching.

7. A power supply as recited in claim 4, in which the balance circuit is passive.

8. A power supply as recited in claim 4, in which the balance circuit comprises an inductor-capacitor resonant charge pump circuit.

9. A power supply as recited in claim 1, in which the first DC power source is renewable.

10. A power supply as recited in claim 1, in which the first DC power source is a photovoltaic system.

11. A power supply as recited in claim 1, further comprising a second DC power source operatively connected to the DC bus.

12. A power supply as recited in claim 1, in which the second DC power source is a battery.

13. A power supply as recited in claim 1, further comprising a second AC power source operatively connected to the AC bus.

14. A power supply as recited in claim 13, in which the second AC power source is an AC generator.

15. A power control system to operatively connect at least first and second AC power sources and at least first and second DC power sources to at least one load, comprising:
    an AC bus operatively connected to the load;
    a DC bus;
    a DC/AC converter operatively connected between the DC bus and the AC bus;
    a first DC/DC converter operatively connected between the first DC source and the DC bus;
    a second DC/DC converter operatively connected between the second DC power source and the DC bus;

a load balancer operatively connected to at least one of the first and second DC/DC converters;

a first control switch operatively connected between the DC/AC converter and the AC bus;

a second control switch operatively connected between the first AC power source and the AC bus; and a third control switch operatively connected between the second AC power source and the AC bus.

16. A power control system as recited in claim 15, in which the load balancer substantially equalizes the charge on first and second split rail capacitors.

17. A power control system as recited in claim 16, in which the load balancer substantially equalizes the charge on first and second split rail capacitors.

18. A power control system as recited in claim 16, in which the load balancer comprises a resonant capacitor and a resonant inductor connected in series.

19. A power control system as recited in claim 17, in which load balancer comprises a balance circuit that is alternately connected between the first and second split rail capacitors.

20. A method of supplying power to at least one load, comprising:

operatively connecting an AC bus to the load;

operatively connecting a first AC power source to the AC bus;

providing a DC/AC converter to convert voltages between the DC bus and the AC bus;

operatively connecting a load balancer between a first DC power source and the DC bus; and operating the power supply in a first mode in which power is supplied to the load from the first AC power source through the AC bus; and a second mode in which power is supplied to the load from the first DC power source through the DC bus, the DC/AC converter, and the AC bus.

* * * * *